US012641656B2

(12) United States Patent (10) Patent No.: US 12,641,656 B2
Li (45) Date of Patent: May 26, 2026

(54) METHOD FOR PAIRING NODES

(71) Applicant: Realtek Semiconductor Corp.,
Hsinchu (TW)

(72) Inventor: ZhaoMing Li, Suzhou City (CN)

(73) Assignee: **REALTEK SEMICONDUCTOR
CORP.,** Hsinchu (TW)

( * ) Notice: Subject to any disclaimer, the term of this
patent is extended or adjusted under 35
U.S.C. 154(b) by 370 days.

(21) Appl. No.: 18/338,564

(22) Filed: Jun. 21, 2023

(65) Prior Publication Data

US 2024/0015822 A1     Jan. 11, 2024

(30) Foreign Application Priority Data

Jul. 7, 2022    (CN) .......................... 202210795783.1

(51) Int. Cl.
*H04W 76/14* (2018.01)
*H04L 1/00* (2006.01)
(Continued)
(52) U.S. Cl.
CPC ........... *H04W 76/14* (2018.02); *H04L 1/0061*
(2013.01); *H04L 63/0428* (2013.01);
(Continued)
(58) Field of Classification Search
CPC ....... H04W 76/14; H04W 8/26; H04W 84/18;
H04L 67/141; H04L 1/0061; H04L
63/0428
See application file for complete search history.

(56) References Cited

U.S. PATENT DOCUMENTS 7,505,432 B2 *  3/2009  Leung ................. H04W 12/062
                                            370/331
7,505,450 B2 *  3/2009  Castagnoli .............. H04L 45/04
                                            370/254
(Continued)

FOREIGN PATENT DOCUMENTS

CN         102413542 A     4/2012
CN         103269387 A     8/2013
(Continued)

OTHER PUBLICATIONS

English translation version of CN 115190563 A, Publication Date:
Oct. 14, 2022, retrieved from PE2E search on Aug. 20, 2025 (Year:
2022).*
(Continued)

*Primary Examiner* — Asad M Nawaz
*Assistant Examiner* — Sanaa Al Samahi
(74) *Attorney, Agent, or Firm* — McClure, Qualey &
Rodack, LLP

(57) ABSTRACT

Disclosed is a method for pairing nodes, which including:
sending, by a node to be paired, a pairing request packet
whose sending address is a MAC address of itself to a relay
node as its parent node; adding, by a relay node receiving the
pairing request packet, the MAC address of the node to be
paired to a refugee table after determining that it can provide
a relay service for the node to be paired; changing, by the
relay node, a receiving address of the pairing request packet
to a MAC address of its parent node if it is a non-root node,
and then forwarding uplink; returning, by the relay node, a
pairing approval packet with receiving address being the
MAC address of the node to be paired if it is a root node;
wherein a pairing is successful if the node to be paired
receives the pairing approval packet.

12 Claims, 19 Drawing Sheets

(51) Int. Cl.
    *H04L 9/40*         (2022.01)
    *H04L 67/141*     (2022.01)
    *H04W 8/26*       (2009.01)
    *H04W 84/18*     (2009.01)

(52) U.S. Cl.
    CPC ............. *H04L 67/141* (2013.01); *H04W 8/26*
    (2013.01); *H04W 84/18* (2013.01)

(56) References Cited

U.S. PATENT DOCUMENTS

| | | | | |
|---|---|---|---|---|
| 10,251,063 | B2 * | 4/2019 | Myers | H04W 12/50 |
| 11,751,270 | B2 | 9/2023 | Dorrer | |
| 2006/0215581 | A1 * | 9/2006 | Castagnoli | H04W 8/04 |
| | | | | 370/254 |
| 2014/0254453 | A1 * | 9/2014 | Berglund | H04L 12/4633 |
| | | | | 370/312 |
| 2018/0152278 | A1 | 5/2018 | Chen et al. | |
| 2018/0331914 | A1 * | 11/2018 | Yoshida | H04W 8/005 |
| 2020/0021969 | A1 * | 1/2020 | Uhling | H04W 52/0216 |

FOREIGN PATENT DOCUMENTS

| | | | | |
|---|---|---|---|---|
| CN | 105162568 | A | 12/2015 | |
| CN | 107205026 | A | 9/2017 | |
| CN | 108200561 | A | 6/2018 | |
| CN | 113132996 | A | 7/2021 | |
| CN | 115190563 | A * | 10/2022 | ............ H04W 40/22 |

OTHER PUBLICATIONS

Yanjiang, Zhou: "Multi-channel Transmission Method for Multi-hop Mechanical Vibration Wireless Sensor Networks"; College of Mechanical Engineering of Chongqing University, Chongqing, China; May 2018; pp. 1-64.

Yuan, et al.: "An energy efficient clustering and relay node selection algorithm in wireless sensor networks"; Proceedings of the 35th Chinese Control Conference Jul. 27-29, 2016, Chengdu, China; pp. 8438-8443.

* cited by examiner sending, by a node to be paired, a pairing request packet to its parent node, and starting a timer, wherein a sending address of the pairing request packet is a MAC address of the node to be paired, a receiving address of the pairing request packet is a MAC address of the parent node of the node to be paired, and the parent node of the node to be paired is a relay node of a mesh network system

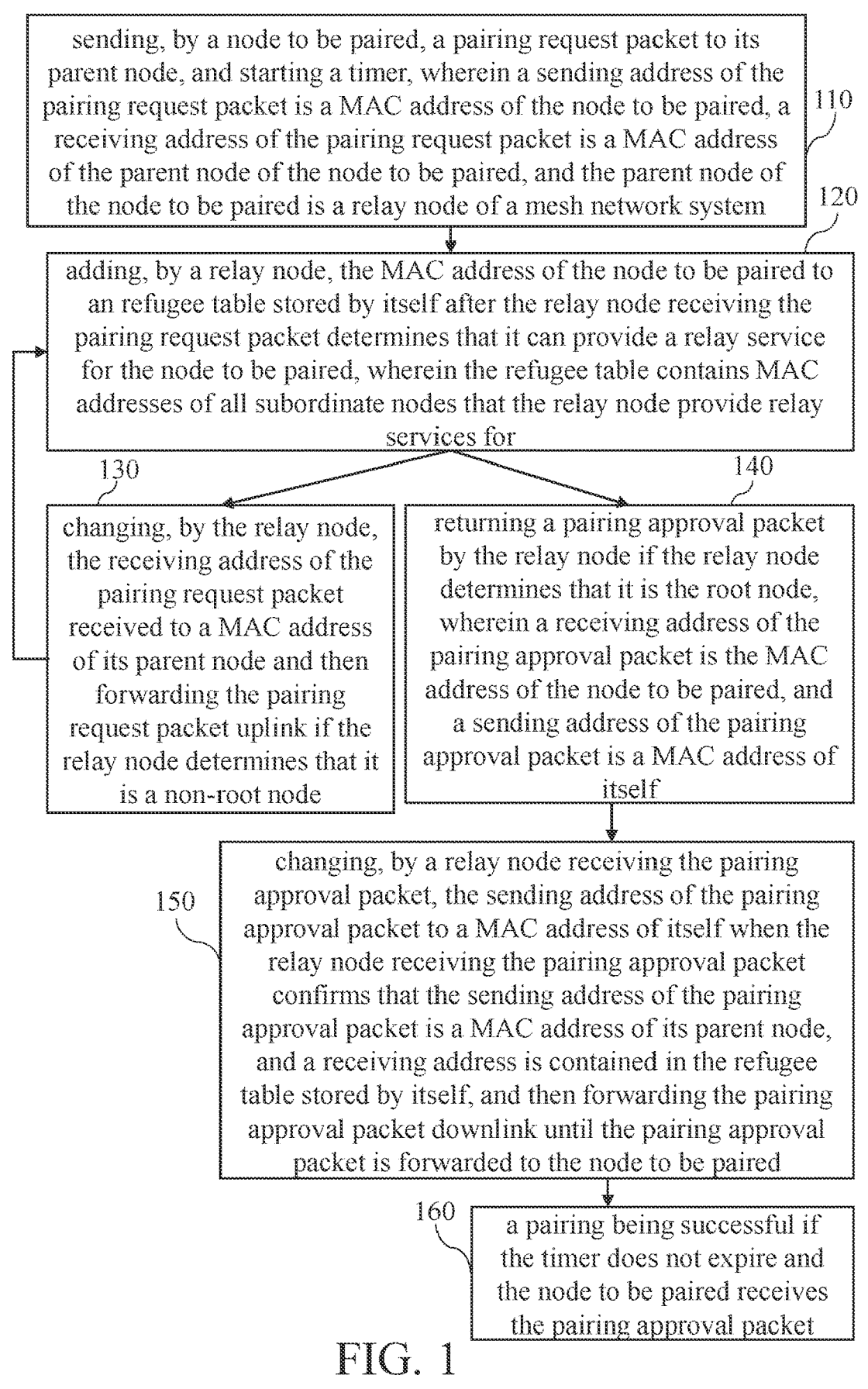

110

120 adding, by a relay node, the MAC address of the node to be paired to an refugee table stored by itself after the relay node receiving the pairing request packet determines that it can provide a relay service for the node to be paired, wherein the refugee table contains MAC addresses of all subordinate nodes that the relay node provide relay services for

130

140 changing, by the relay node, the receiving address of the pairing request packet received to a MAC address of its parent node and then forwarding the pairing request packet uplink if the relay node determines that it is a non-root node returning a pairing approval packet by the relay node if the relay node determines that it is the root node, wherein a receiving address of the pairing approval packet is the MAC address of the node to be paired, and a sending address of the pairing approval packet is a MAC address of itself

150 changing, by a relay node receiving the pairing approval packet, the sending address of the pairing approval packet to a MAC address of itself when the relay node receiving the pairing approval packet confirms that the sending address of the pairing approval packet is a MAC address of its parent node, and a receiving address is contained in the refugee table stored by itself, and then forwarding the pairing approval packet downlink until the pairing approval packet is forwarded to the node to be paired

160 a pairing being successful if the timer does not expire and the node to be paired receives the pairing approval packet

FIG. 1

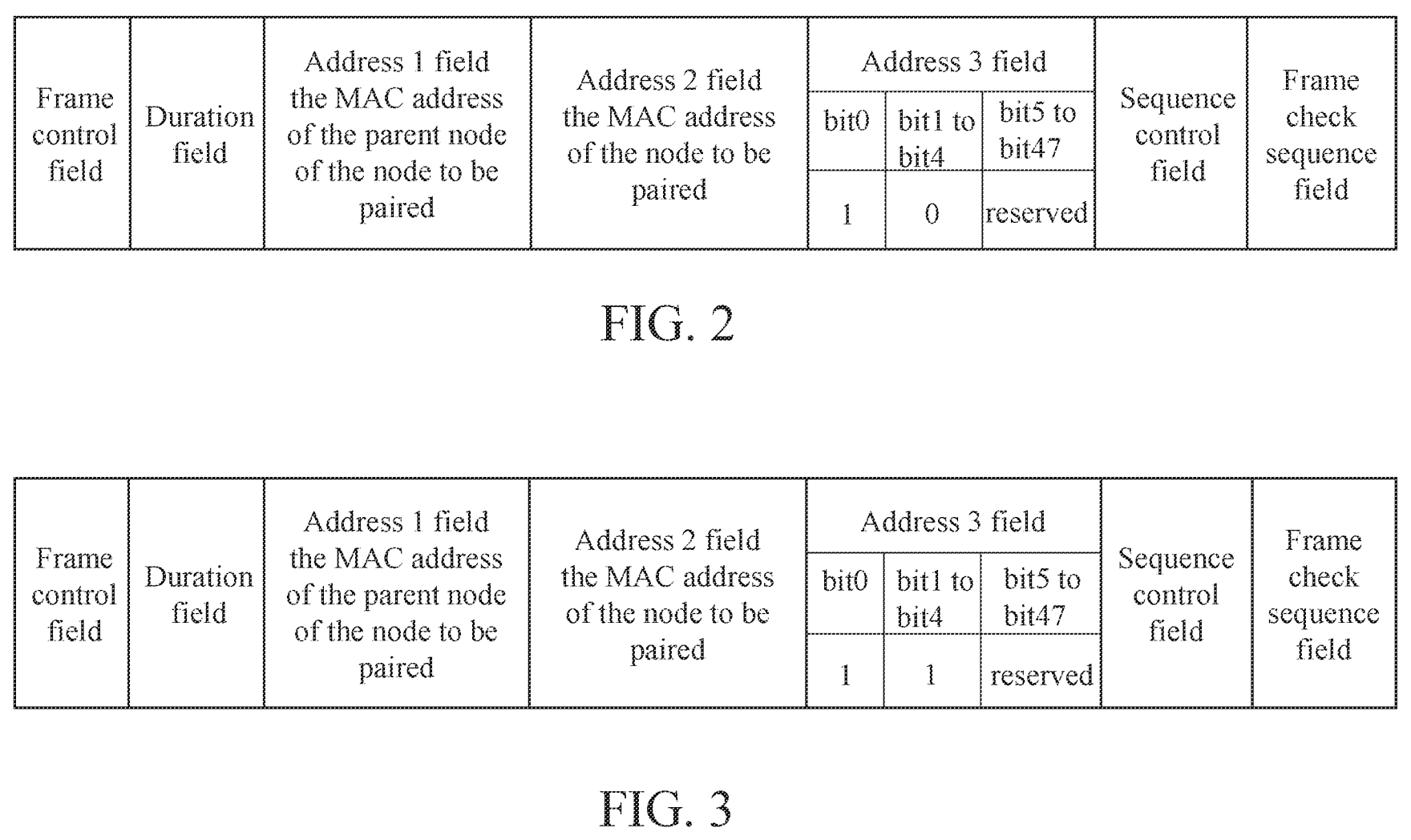

| Frame control field | Duration field | Address 1 field the MAC address of the parent node of the node to be paired | Address 2 field the MAC address of the node to be paired | Address 3 field | | | Sequence control field | Frame check sequence field |
|---|---|---|---|---|---|---|---|---|
| | | | | bit0 | bit1 to bit4 | bit5 to bit47 | | |
| | | | | 1 | 0 | reserved | | |

FIG. 2

| Frame control field | Duration field | Address 1 field the MAC address of the parent node of the node to be paired | Address 2 field the MAC address of the node to be paired | Address 3 field | | | Sequence control field | Frame check sequence field |
|---|---|---|---|---|---|---|---|---|
| | | | | bit0 | bit1 to bit4 | bit5 to bit47 | | |
| | | | | 1 | 1 | reserved | | |

300a/300b/300c sending, by a node to be paired, a pairing request packet to its parent node, and starting a timer, wherein a sending address of the pairing request packet is a MAC address of the node to be paired, a receiving address of the pairing request packet is a MAC address of the parent node of the node to be paired, and the parent node of the node to be paired is a relay node of a mesh network system — 110

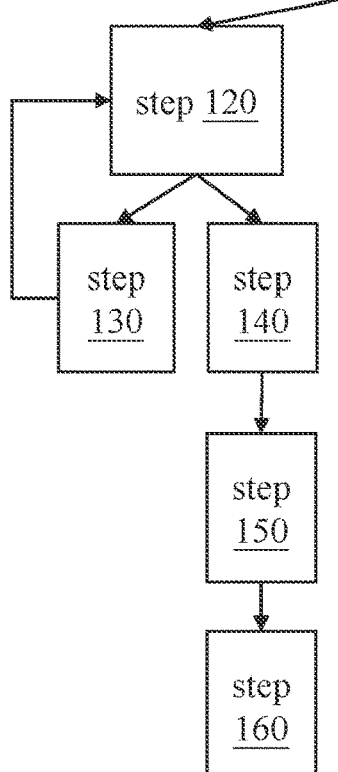

step 120 step 130 step 140 step 150 step 160 returning, by the relay node receiving the pairing request packet, a pairing rejection packet when the relay node receiving the pairing request packet determines that it cannot provide the relay service for the node to be paired, wherein a receiving address of the pairing rejection packet is the MAC address of the node to be paired and a sending address of the pairing rejection packet is a MAC address of itself — 170 deleting, by the relay node receiving the pairing rejection packet, the MAC address of the node to be paired from a refugee table stored by itself when the relay node receiving the pairing rejection packet determines that the sending address of the pairing rejection packet is a MAC address of its parent node and the receiving address of the pairing rejection packet is contained in the refugee table stored by itself, and changing the sending address of the pairing rejection packet received to a MAC address of itself, and then forwarding the pairing rejection packet downlink until the pairing rejection data packet is forwarded to the node to be paired — 180 the pairing failing if the timer does not expire and the node to be paired receives the pairing rejection packet — 190

FIG. 9

| Frame control field | Duration field | Address 1 field the MAC address of the parent node of the node to be paired | Address 2 field the MAC address of the node to be paired | Address 3 field | | | Sequence control field | Frame check sequence field |
|---|---|---|---|---|---|---|---|---|
| | | | | bit0 | bit1 to bit4 | bit5 to bit47 | | |
| | | | | 1 | 2 | reserved | | |

FIG. 10

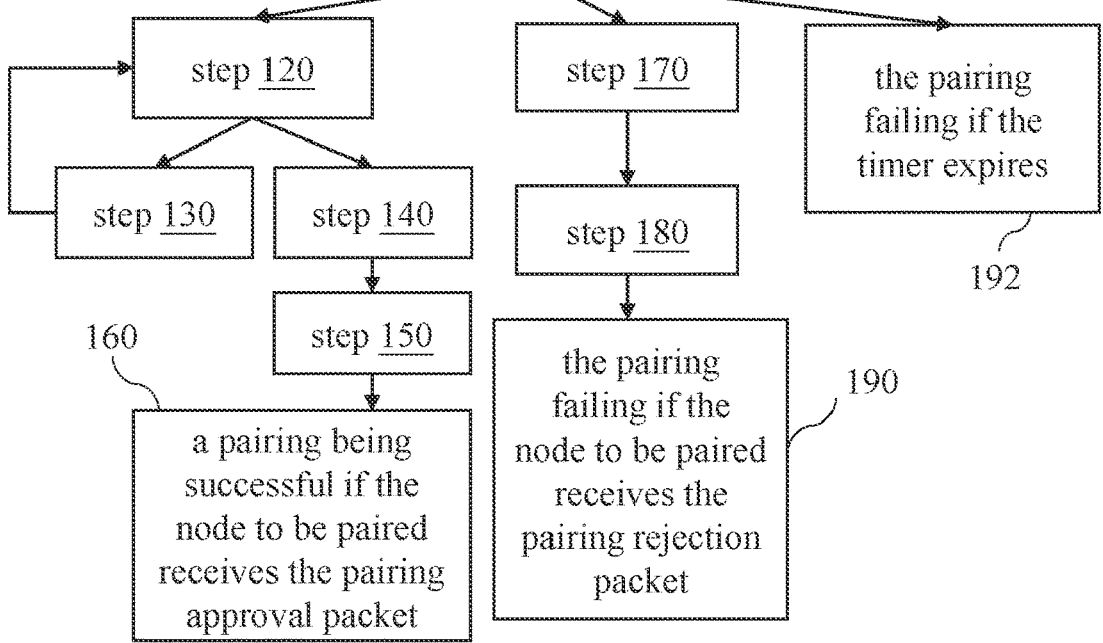

obtaining, by the node to be paired, a received signal strength indication (RSSI) value between each relay node and an access point in the mesh network system and a RSSI value between the node to be paired and each relay node based on multiple beacon packets or multiple probe response packets obtained by a scanning procedure ⌐104 selecting, by the node to be paired, a relay node as its parent node based on the RSSI value between each relay node and the access point and the RSSI value between the node to be paired and each relay node ⌐106 setting the node to be paired to only receive various types of packets that meet a filtering condition, wherein the filtering condition is that a sending address of each type of packets is the MAC address of the parent node of the node to be paired and a receiving address of each type of packets is the MAC address of the node to be paired ⌐102 sending, by a node to be paired, a pairing request packet to its parent node, and starting a timer, wherein a sending address of the pairing request packet is a MAC address of the node to be paired, a receiving address of the pairing request packet is a MAC address of the parent node of the node to be paired, and the parent node of the node to be paired is a relay node of a mesh network system ⌐110 step 120 step 130    step 140 step 150

160 a pairing being successful if the node to be paired receives the pairing approval packet step 170 step 180 the pairing failing if the node to be paired receives the pairing rejection packet 190 the pairing failing if the timer expires

192

FIG. 13 sending, by a node to be paired, a pairing request packet to its parent node, and starting a timer, wherein a sending address of the pairing request packet is the MAC address of the node to be paired, a receiving address of the pairing request packet is the parent node of the node to be paired, and the parent node of the node to be paired is a relay node of a mesh network system

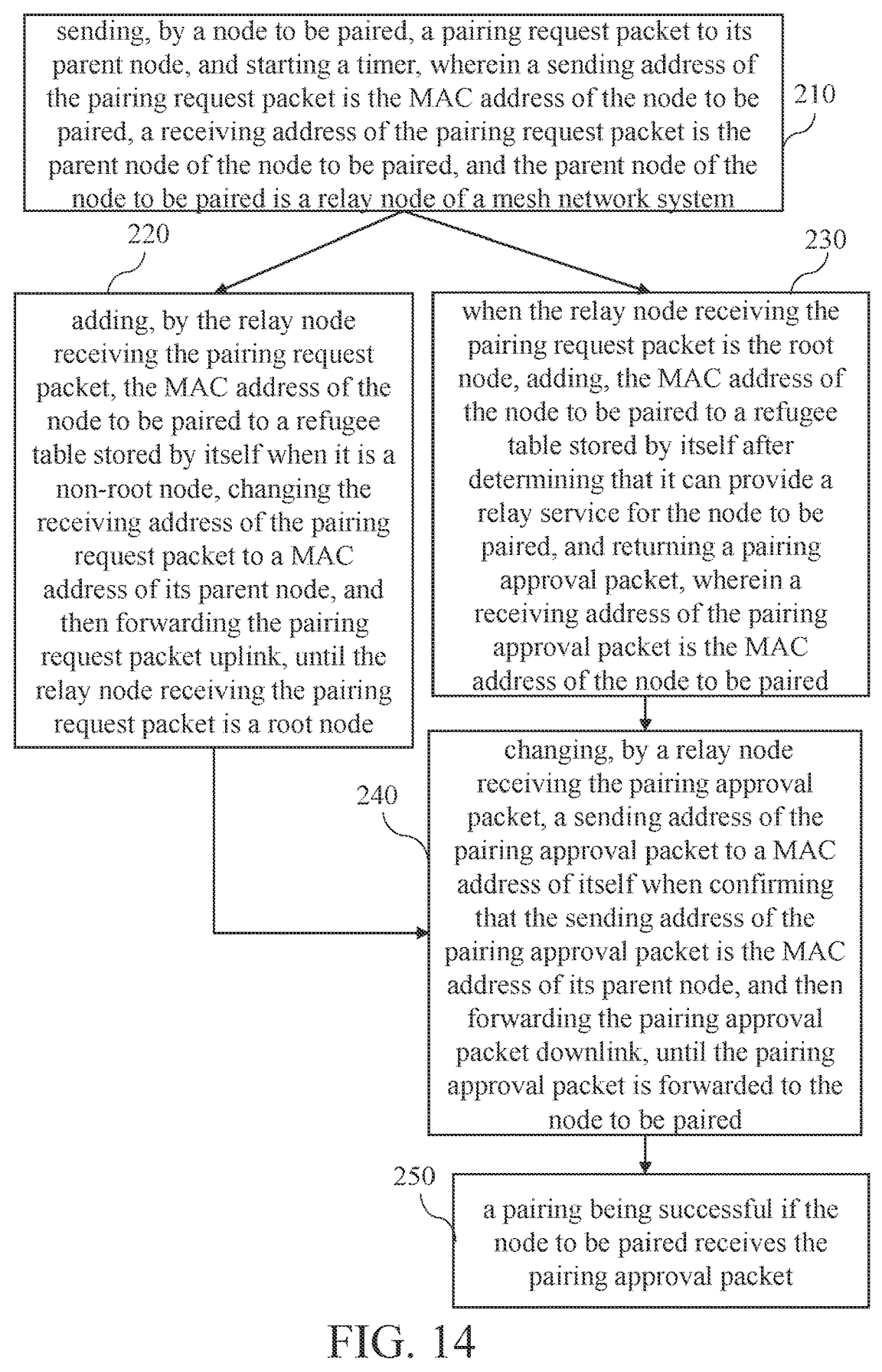

210

220 adding, by the relay node receiving the pairing request packet, the MAC address of the node to be paired to a refugee table stored by itself when it is a non-root node, changing the receiving address of the pairing request packet to a MAC address of its parent node, and then forwarding the pairing request packet uplink, until the relay node receiving the pairing request packet is a root node

230 when the relay node receiving the pairing request packet is the root node, adding, the MAC address of the node to be paired to a refugee table stored by itself after determining that it can provide a relay service for the node to be paired, and returning a pairing approval packet, wherein a receiving address of the pairing approval packet is the MAC address of the node to be paired

240 changing, by a relay node receiving the pairing approval packet, a sending address of the pairing approval packet to a MAC address of itself when confirming that the sending address of the pairing approval packet is the MAC address of its parent node, and then forwarding the pairing approval packet downlink, until the pairing approval packet is forwarded to the node to be paired

250 a pairing being successful if the node to be paired receives the pairing approval packet

FIG. 14

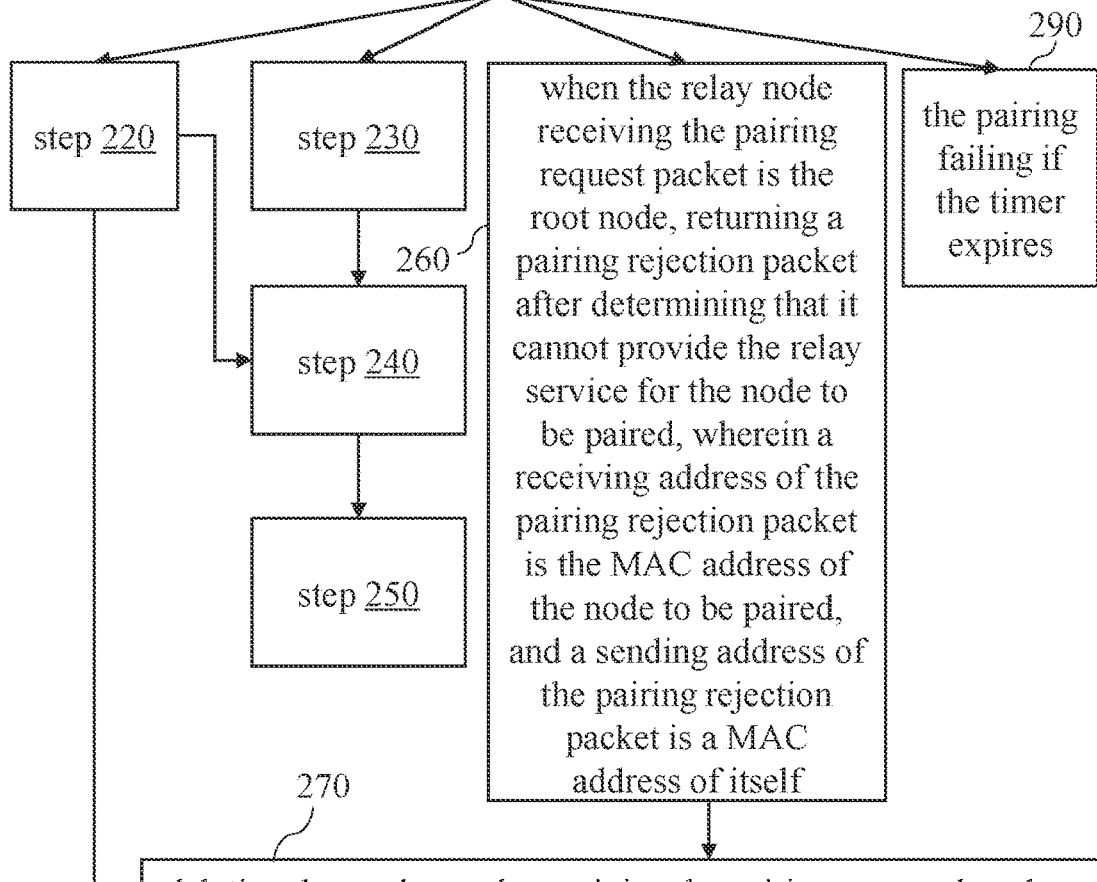

sending, by a node to be paired, a pairing request packet to its parent node, and starting a timer, wherein a sending address of the pairing request packet is the MAC address of the node to be paired, a receiving address of the pairing request packet is the parent node of the node to be paired, and the parent node of the node to be paired is a relay node of a mesh network system 210 step 220 step 230 260 step 240 step 250 when the relay node receiving the pairing request packet is the root node, returning a pairing rejection packet after determining that it cannot provide the relay service for the node to be paired, wherein a receiving address of the pairing rejection packet is the MAC address of the node to be paired, and a sending address of the pairing rejection packet is a MAC address of itself the pairing failing if the timer expires 290 deleting, by a relay node receiving the pairing approval packet, the MAC address of the node to be paired from the refugee table stored by itself when confirming that the sending address of the pairing rejection packet is the MAC address of its parent node, and changing the sending address of the pairing rejection packet to a MAC address of itself, and then forwarding the pairing rejection packet downlink, until the pairing rejection packet is forwarded to the node to be paired 270 the pairing failing if the node to be paired receives the pairing rejection packet 280

FIG. 15 sending, by a node to be paired, a pairing request packet to its parent node, and starting a timer, wherein a sending address of the pairing request packet is a MAC address of the node to be paired, a receiving address of the pairing request packet is the parent node of the node to be paired, and the parent node of the node to be paired is a relay node of a mesh network system

310 adding, by a relay node receiving the pairing request packet, the MAC address of the node to be paired to a refugee table stored by itself after determining that it can provide a relay service for the node to be paired, and returning a pairing approval packet to the node to be paired, wherein a receiving address of the pairing approval packet is the MAC address of the node to be paired

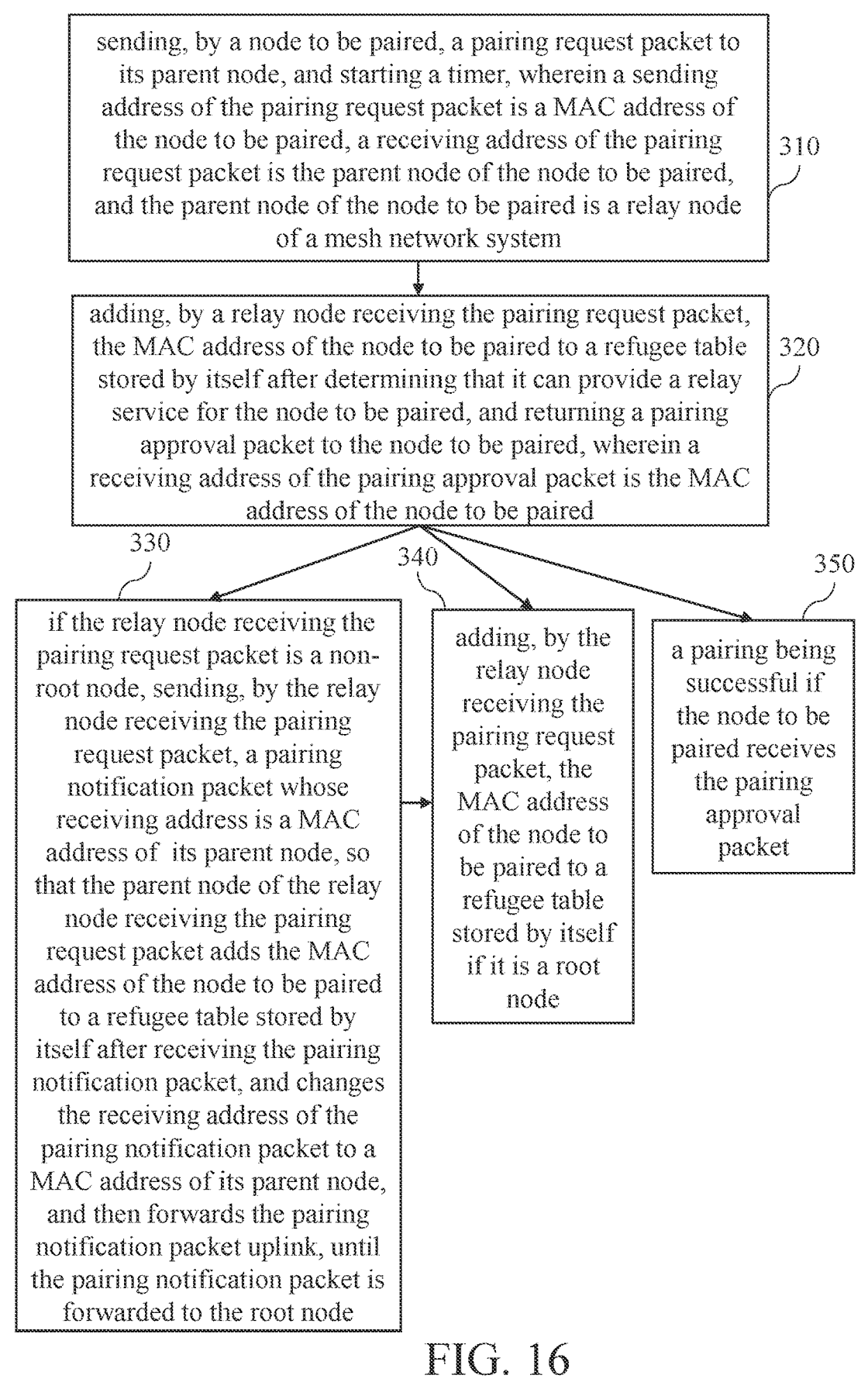

320

330 if the relay node receiving the pairing request packet is a non-root node, sending, by the relay node receiving the pairing request packet, a pairing notification packet whose receiving address is a MAC address of its parent node, so that the parent node of the relay node receiving the pairing request packet adds the MAC address of the node to be paired to a refugee table stored by itself after receiving the pairing notification packet, and changes the receiving address of the pairing notification packet to a MAC address of its parent node, and then forwards the pairing notification packet uplink, until the pairing notification packet is forwarded to the root node

340 adding, by the relay node receiving the pairing request packet, the MAC address of the node to be paired to a refugee table stored by itself if it is a root node

350 a pairing being successful if the node to be paired receives the pairing approval packet

FIG. 16

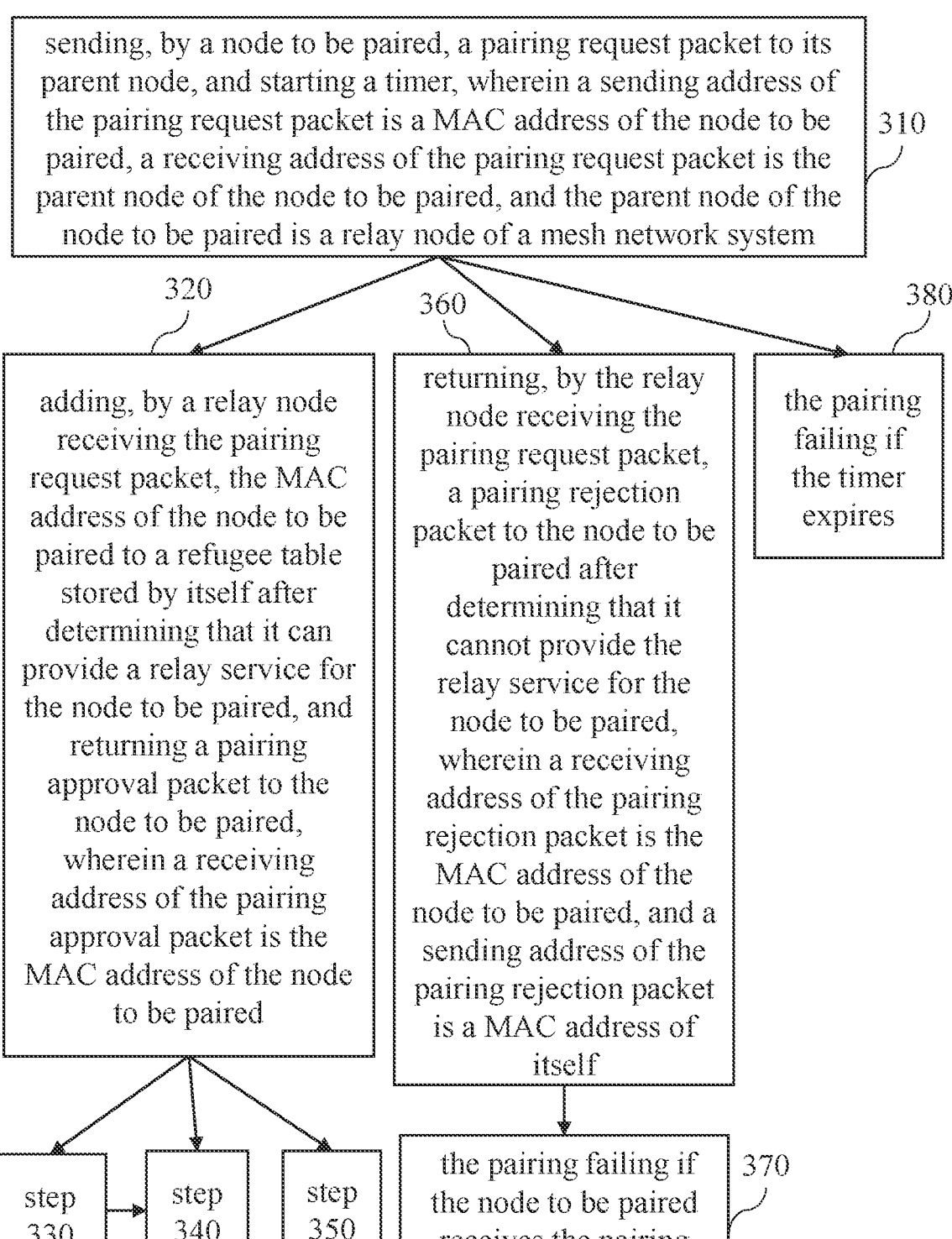

sending, by a node to be paired, a pairing request packet to its parent node, and starting a timer, wherein a sending address of the pairing request packet is a MAC address of the node to be paired, a receiving address of the pairing request packet is the parent node of the node to be paired, and the parent node of the node to be paired is a relay node of a mesh network system

310

320

360

380 adding, by a relay node receiving the pairing request packet, the MAC address of the node to be paired to a refugee table stored by itself after determining that it can provide a relay service for the node to be paired, and returning a pairing approval packet to the node to be paired, wherein a receiving address of the pairing approval packet is the MAC address of the node to be paired returning, by the relay node receiving the pairing request packet, a pairing rejection packet to the node to be paired after determining that it cannot provide the relay service for the node to be paired, wherein a receiving address of the pairing rejection packet is the MAC address of the node to be paired, and a sending address of the pairing rejection packet is a MAC address of itself the pairing failing if the timer expires step 330 step 340 step 350 the pairing failing if the node to be paired receives the pairing rejection packet

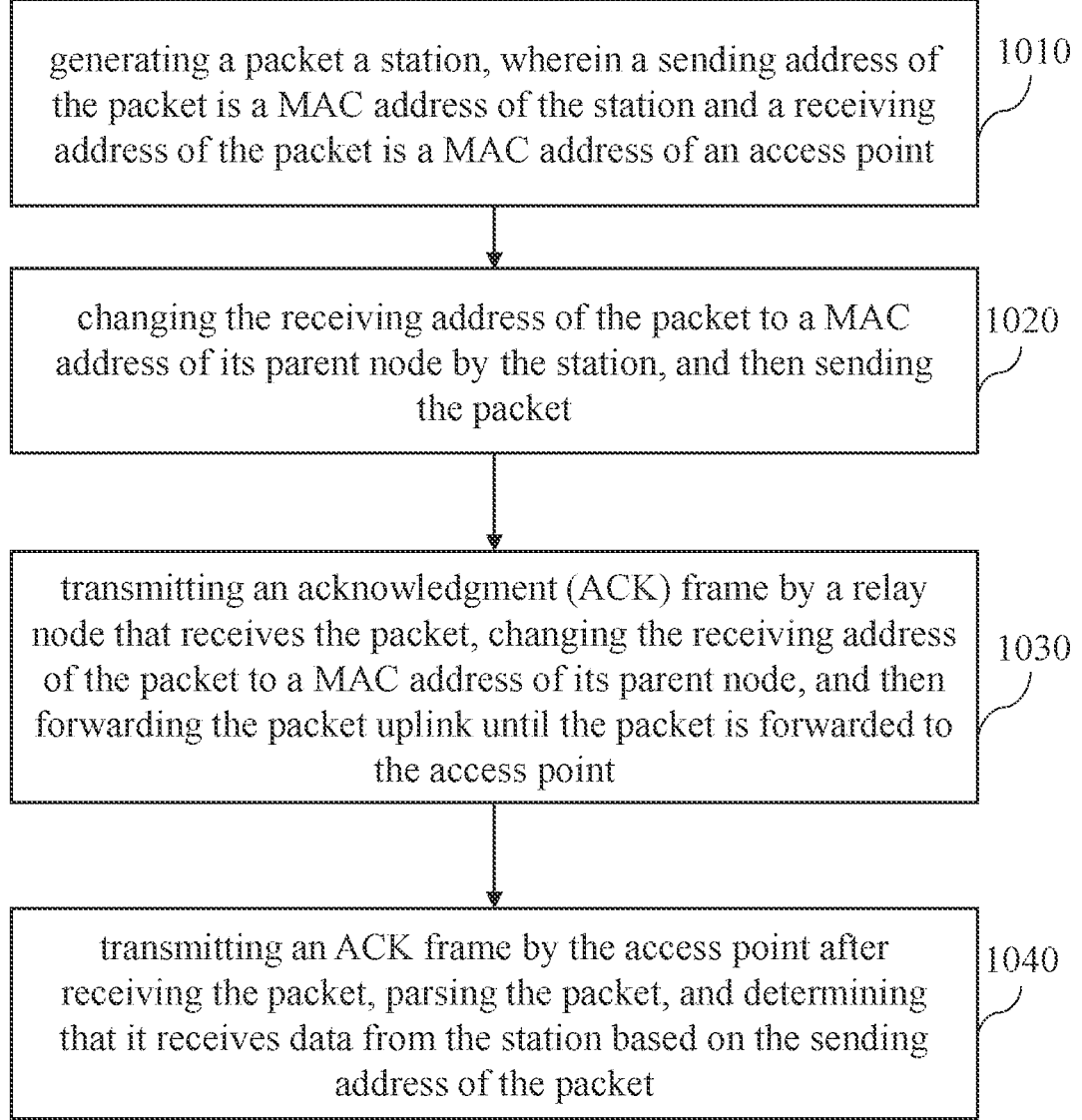

generating a packet a station, wherein a sending address of the packet is a MAC address of the station and a receiving address of the packet is a MAC address of an access point

1010 changing the receiving address of the packet to a MAC address of its parent node by the station, and then sending the packet

1020 transmitting an acknowledgment (ACK) frame by a relay node that receives the packet, changing the receiving address of the packet to a MAC address of its parent node, and then forwarding the packet uplink until the packet is forwarded to the access point

1030 transmitting an ACK frame by the access point after receiving the packet, parsing the packet, and determining that it receives data from the station based on the sending address of the packet

Figure 19:
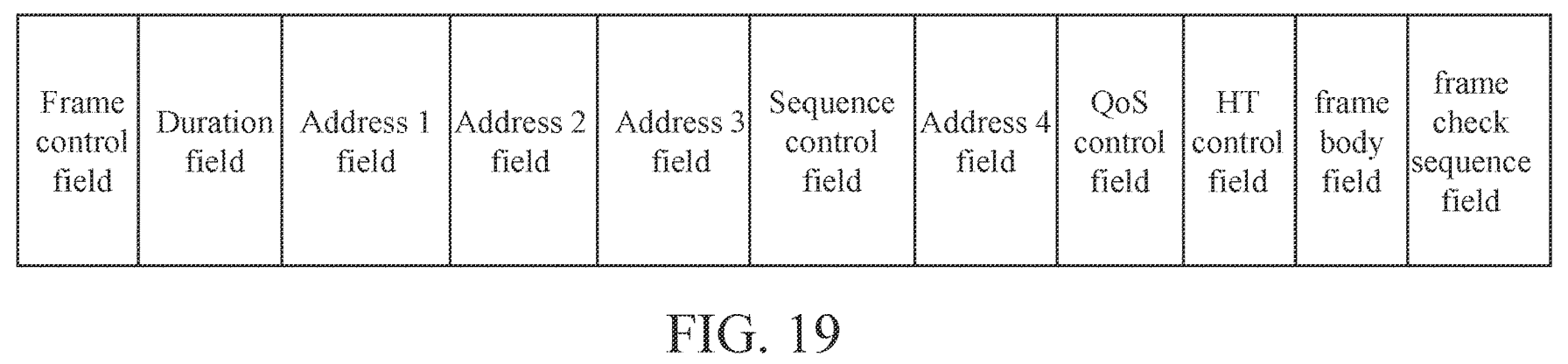

| Frame control field | Duration field | Address 1 field | Address 2 field | Address 3 field | Sequence control field | Address 4 field | QoS control field | HT control field | frame body field | frame check sequence field |
|---|---|---|---|---|---|---|---|---|---|---|

Figure 20:
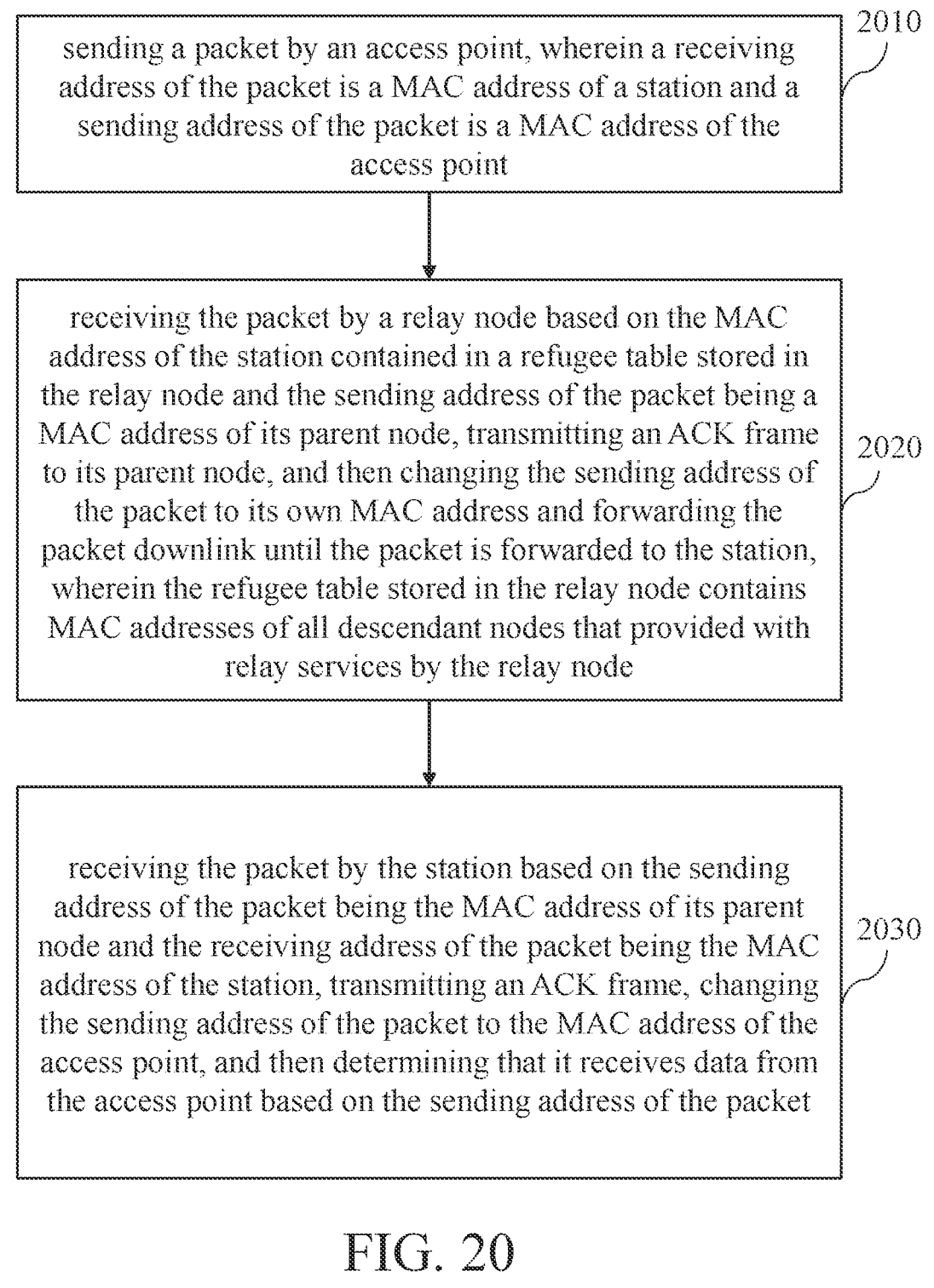

FIG. 19 sending a packet by an access point, wherein a receiving
address of the packet is a MAC address of a station and a
sending address of the packet is a MAC address of the
access point

2010 receiving the packet by a relay node based on the MAC
address of the station contained in a refugee table stored in
the relay node and the sending address of the packet being a
MAC address of its parent node, transmitting an ACK frame
to its parent node, and then changing the sending address of
the packet to its own MAC address and forwarding the
packet downlink until the packet is forwarded to the station,
wherein the refugee table stored in the relay node contains
MAC addresses of all descendant nodes that provided with
relay services by the relay node

2020 receiving the packet by the station based on the sending
address of the packet being the MAC address of its parent
node and the receiving address of the packet being the MAC
address of the station, transmitting an ACK frame, changing
the sending address of the packet to the MAC address of the
access point, and then determining that it receives data from
the access point based on the sending address of the packet

METHOD FOR PAIRING NODES

CROSS REFERENCE TO RELATED PRESENT DISCLOSURE

This application claims the priority benefit of Chinese Patent Application Serial Number 202210795783.1, filed on Jul. 7, 2022, the full disclosure of which is incorporated herein by reference.

BACKGROUND

Technical Field

The present disclosure relates to the field of communication, and, to a method for pairing nodes.

Related Art

For the security of the mesh network system, when a new node wants to join a mesh network system, identity authentication and related key generation are required to complete node pairing. A security scheme known as a Mesh Security Association (MSA) is often employed.

The MSA authentication process comprises a peer link management stage, an initial MSA authentication stage which is optional, and an MSA four-way handshake stage. The peer link management stage comprises: sending, by a new node and a relay node in a mesh network system, a peer link open message comprising various security parameters required for subsequent stages to each other; and sending, by the new node and the relay node, a peer link confirm message to each other to confirm the selected various key sets, whether to perform initial MSA authentication and role negotiation results after processing the peer link open message sent by the other party and confirming that it is correct (that is, the new node establishes a peer-to-peer link with the relay node). If the initial MSA authentication is required, extensible authentication protocol (EAP) authentication starts at the initial MSA authentication stage to authenticate the identity of the new node, and after the authentication is passed, the mesh key distributor (MKD) derives and calculates pairwise master key-mesh authenticator (PMK-MA) based on the main session key (MSK) generated by the authentication server corresponding to the new node. The new node and the relay node perform a four-way handshake mechanism using PMK-MA as the session master key to construct a pairwise transient key (PTK) and a group temporary key (GTK), and use the PTK and the GTK to protect the confidentiality and integrity of transmitted data.

However, the current MSA authentication process requires the interaction of multiple packets, which may cause significant delays. Whenever a node leaves and rejoins a mesh network system, it must go through the same authentication process to complete the node pairing, and the excessively long node pairing process causes problems such as communication delay and battery loss for the new node.

Therefore, a method for pairing nodes is needed to allow a new node to join the mesh network system quickly and efficiently.

SUMMARY

The embodiments of the present disclosure provide a method for pairing nodes, which can solve problems such as communication delay and battery loss for a new node in the prior art because node pairing requires the interaction of multiple packets.

In order to solve above-mentioned technical problem, the present disclosure is implemented as follows.

In the first aspect, the present disclosure provides a method for pairing nodes, comprising the following steps: sending, by a node to be paired, a pairing request packet to its parent node, wherein a sending address of the pairing request packet is a MAC address of the node to be paired, a receiving address of the pairing request packet is a MAC address of the parent node of the node to be paired, and the parent node of the node to be paired is a relay node of a mesh network system; adding, by a relay node, the MAC address of the node to be paired to an refugee table stored by itself after the relay node receiving the pairing request packet determines that it can provide a relay service for the node to be paired, wherein the refugee table contains MAC addresses of all subordinate nodes that the relay node provide relay services for; changing, by the relay node, the receiving address of the pairing request packet received to a MAC address of its parent node if the relay node is a non-root node, and then forwarding the pairing request packet uplink, until the relay node receiving the pairing request packet is a root node; returning, by the relay node, a pairing approval packet if the relay node is the root node, wherein a receiving address of the pairing approval packet is the MAC address of the node to be paired, and a sending address of the pairing approval packet is a MAC address of itself; wherein a pairing is successful if the node to be paired receives the pairing approval packet.

In the second aspect, the present disclosure provides another method for pairing nodes, which comprises the following steps: sending, by a node to be paired, a pairing request packet to its parent node, wherein a sending address of the pairing request packet is the MAC address of the node to be paired, a receiving address of the pairing request packet is the parent node of the node to be paired, and the parent node of the node to be paired is a relay node of a mesh network system; adding, by the relay node receiving the pairing request packet, the MAC address of the node to be paired to a refugee table stored by itself when it is a non-root node, changing the receiving address of the pairing request packet to a MAC address of its parent node, and then forwarding the pairing request packet uplink, until the relay node receiving the pairing request packet is a root node; when the relay node receiving the pairing request packet is the root node, adding, the MAC address of the node to be paired to a refugee table stored by itself after determining that it can provide a relay service for the node to be paired, and returning a pairing approval packet, wherein a receiving address of the pairing approval packet is the MAC address of the node to be paired, a sending address of the pairing approval packet is a MAC address of itself, and the refugee table contains MAC addresses of all subordinate nodes that the relay node provides relay services for; changing, by a relay node receiving the pairing approval packet, the sending address of the pairing approval packet to a MAC address of itself when confirming that the sending address of the pairing approval packet is the MAC address of its parent node, and then forwarding the pairing approval packet downlink, until the pairing approval packet is forwarded to the node to be paired; wherein a pairing is successful if the node to be paired receives the pairing approval packet.

In a third aspect, the present disclosure provides yet another method for pairing nodes, which comprises the following steps: sending, by a node to be paired, a pairing request packet to its parent node, wherein a sending address of the pairing request packet is a MAC address of the node to be paired, a receiving address of the pairing request packet is the parent node of the node to be paired, and the parent node of the node to be paired is a relay node of a mesh network system; adding, by a relay node receiving the pairing request packet, the MAC address of the node to be paired to a refugee table stored by itself after determining that it can provide a relay service for the node to be paired, and returning a pairing approval packet to the node to be paired, wherein a receiving address of the pairing approval packet is the MAC address of the node to be paired, a sending address of the pairing approval packet is a MAC address of itself, and the refugee table contains MAC addresses of all subordinate nodes that the relay provide relay services for; if the relay node receiving the pairing request packet is a non-root node, sending, by the relay node receiving the pairing request packet, a pairing notification packet whose receiving address is a MAC address of its parent node and whose source address is the MAC address of the node to be paired, so that the parent node of the relay node receiving the pairing request packet adds the MAC address of the node to be paired to a refugee table stored by itself after receiving the pairing notification packet, and changes the receiving address of the pairing notification packet to a MAC address of its parent node, and then forwarding the pairing notification packet uplink, until the pairing notification packet is forwarded to the root node; adding, by the relay node receiving the pairing request packet, the MAC address of the node to be paired to a refugee table stored by itself if it is a root node; wherein a pairing is successful if the node to be paired receives the pairing approval packet.

In the embodiments of the present disclosure, only the interaction of two packets (i.e., the pairing request packet and the pairing approval packet) is required between a node to be paired and its parent node (that is, the relay node of the mesh network system), so that the node to be paired can quickly and efficiently join the mesh network system. In addition, the relay node as a non-root node performs uplink data forwarding by changing the receiving address of the pairing request packet received, or changing the sending address of the pairing approval packet received for downlink data forwarding, so that there is no need to encrypt and decrypt the pairing request packet or the pairing approval packet, which effectively improves the forwarding efficiency. Moreover, in the method for pairing nodes, the relay node only needs to maintain a refugee table containing the MAC addresses of all subordinate nodes that it can provide relay services for, and does not need to maintain a routing table containing path information to a specific relay node. The amount of data stored in the refugee table is smaller than that in the routing table, and the cache requirements for relay nodes are also relatively small, so that the refugee table is suitable for a mesh network system with many network nodes, and the efficiency of downlink forwarding can be more effectively improved by quickly confirming whether there is a MAC address of the node to be paired in the refugee table.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 1 is a flow chart of a method for pairing nodes according to a first embodiment of the present disclosure;

FIG. 2 is a schematic diagram of a format of a pairing request packet according to an embodiment of the present disclosure;

FIG. 3 is a schematic diagram of a format of a pairing approval packet according to an embodiment of the present disclosure;

FIG. 9 is a flowchart of a method for pairing nodes according to a second embodiment of the present disclosure;

FIG. 10 is a schematic diagram of a format of a pairing rejection packet according to an embodiment of the present disclosure;

FIG. 13 is a flowchart of a method for pairing nodes according to a fourth embodiment of the present disclosure;

FIG. 14 is a flowchart of a method for pairing nodes according to a fifth embodiment of the present disclosure;

FIG. 15 is a flowchart of a method for pairing nodes according to a sixth embodiment of the present disclosure;

FIG. 16 is a flowchart of a method for pairing nodes according to a seventh embodiment of the present disclosure;

FIG. 17 is a flowchart of a method for pairing nodes according to an eighth embodiment of the present disclosure;

FIG. 18 is a flowchart of a data transmission method according to a first embodiment of the present disclosure;

FIG. 19 is a schematic diagram of a format of a packet generated by a station according to an embodiment the present disclosure; and FIG. 20 is a flowchart of a data transmission method according to a second embodiment of the present disclosure.

DETAILED DESCRIPTION OF THE EMBODIMENTS

Figure 4:
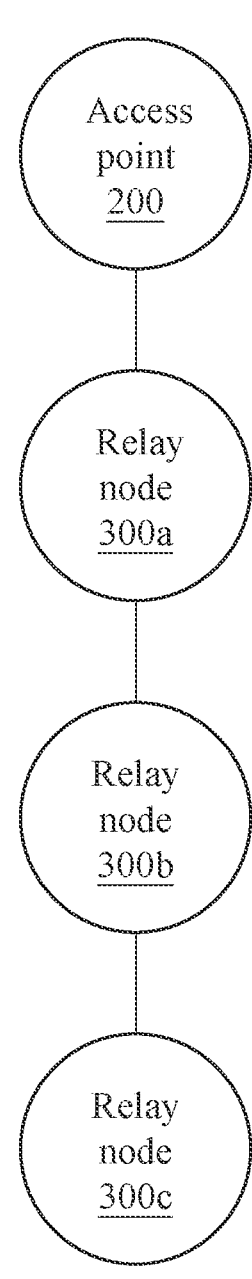
FIG. 4 is a schematic diagram of a mesh network system according to an embodiment of the present disclosure.

The following embodiments describe the features and advantages of the present disclosure in detail, but do not limit the scope of the present disclosure in any point of view. According to the description, claims, and drawings, a person ordinarily skilled in the art can easily understand the technical content of the present disclosure and implement it accordingly.

The embodiments of the present disclosure will be described below in conjunction with the relevant drawings. In the figures, the same reference numbers refer to the same or similar components or method flows.

It must be understood that the words "comprising", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as being "directly connected" or "directly coupled" to another element, there is no intervening element therebetween.

Before a method for pairing nodes and a relay node of the present disclosure are described, the nouns of the present disclosure are explained first. The noun "mesh network system" mentioned in the present disclosure refers to a mesh communication network formed by network nodes communicating with each other (that is, a mesh network system comprises multiple network nodes). The noun "network node" refers to a computing device connected to a network with independent addressing, transmitting or receiving data capabilities, such as a workstation, a server, a terminal device, and a network device, wherein the network node with the relay function is called a relay node, and the network node without the relay function is called a station (STA). All network nodes can provide the STA function working as a station in the infrastructure mode defined by the 802.11 protocol, so the relay node can execute different programs to play the role of a station. It should be noted that, for a relay node, the MAC addresses used for the STA function and the MAC addresses used for the relay function can be the same or different. The network node/relay node directly connected to an access point (AP) is called a root node. The network node connected to the access point through the root node is called a second-level node, the network node connected to the access point through the second-level node is called a third-level node, and so on. For two network nodes that are directly connected to each other, the upper-level network node is called a parent node of the lower-level network node, and the lower-level network node is called a child node of the upper-level network node. Each network node has only one parent node, and a parent node can have many child nodes. The root node is directly connected to the access point, and the access point can be considered as the parent node of the root node. The network node whose level is greater than the level of a certain network node is called the subordinate node of the certain network node. For example, the third-level node, the fourth-level node, and the fifth-level node are all subordinate nodes of the second-level node. All subordinate nodes that need to communicate with the access point through a certain network node are called descendant nodes of the certain network node. In addition, the "refugee table" stored in a relay node mentioned in the present disclosure is used for recording the relevant information of the descendant nodes of the relay node, such as a MAC address and a variant on the MAC address, wherein the variant on the MAC address is the result of the hash calculation of the MAC address, or the result of the cyclic redundancy check (CRC) calculation of the MAC address. In the following embodiments, the refugee table stored in a relay node is used for recording the MAC addresses of descendant nodes of the relay node for illustration. Moreover, the "node to be paired" mentioned in the present disclosure refers to a new node that intends to join the mesh network system, which may or may not have the relay capability; when the node to be paired has the relay capability, it can have the same module and structure as the relay node, and play different roles because it executes different programs. Furthermore, the "MAC address of the access point" mentioned in the present disclosure refers to the basic service set identifier (BSSID) of the access point.

Please refer to FIG. 1, which is a flow chart of a method for pairing nodes according to a first embodiment of the present disclosure. The method for pairing nodes comprises: sending, by a node to be paired, a pairing request packet to its parent node, and starting a timer, wherein a sending address of the pairing request packet is a MAC address of the node to be paired, a receiving address of the pairing request packet is a MAC address of the parent node of the node to be paired, and the parent node of the node to be paired is a relay node of a mesh network system (step 110); adding, by a relay node, the MAC address of the node to be paired to an refugee table stored by itself after the relay node receiving the pairing request packet determines that it can provide a relay service for the node to be paired, wherein the refugee table contains MAC addresses of all subordinate nodes that the relay node provide relay services for (step 120); changing, by the relay node, the receiving address of the pairing request packet received to a MAC address of its parent node if the relay node is a non-root node, and then forwarding the pairing request packet uplink, until the relay node receiving the pairing request packet is a root node (step 130); returning, by the relay node, a pairing approval packet if the relay node is the root node, wherein a receiving address of the pairing approval packet is the MAC address of the node to be paired, and a sending address of the pairing approval packet is a MAC address of itself (step 140); changing, by a relay node receiving the pairing approval packet, the sending address of the pairing approval packet to a MAC address of itself when the relay node receiving the pairing approval packet confirms that the sending address of the pairing approval packet is a MAC address of its parent node, and a receiving address is contained in the refugee table stored by itself, and then forwarding the pairing approval packet downlink until the pairing approval packet is forwarded to the node to be paired (step 150); a pairing being successful if the node to be paired receives the pairing approval packet (step 160). It should be noted that, when the parent node of the node to be paired is the root node, step 130 may be omitted.

In an embodiment, when the parent node of the node to be paired is a non-root node, the method for pairing nodes may further comprise after step 140 and before step 160: changing, by the relay node receiving the pairing approval packet, the sending address of the pairing approval packet to a MAC address of itself when it confirms that the sending address of the pairing approval packet is a MAC address of its parent node and the receiving address is contained in the refugee table stored by itself, and then forwarding the pairing approval packet downlink, until the pairing request packet is forwarded to the node to be paired (step 150).

Each of the format of the pairing request packet and the pairing approval packet can be a frame defined by the 802.11 protocol, such as a data frame, a management frame, a control frame, and other self-defined frames, and the pairing request packet and the pairing approval packet can use the same type of packet having different meanings or use different types of packets.

In one embodiment, the format of the pairing request packet may be a null data frame defined by the 802.11 protocol. The null data frame comprises a frame control field, a duration field, an address 1 field, an address 2 field, an address 3 field, a sequence control field, and a frame check sequence field. Specifically, sending, by the node to be paired, the pairing request packet in step 110 comprises: filling, by the node to be paired, an address 1 field in a null data frame with the MAC address of the parent node of the node to be paired, filling an address 2 field with the MAC address of the node to be paired, setting a first preset bit of the address 3 field to a first preset value to define the null data frame as a handshake frame, and setting a plurality of second preset bits of an address 3 field to a third preset value to define a type of the handshake frame as a pairing request, so as to generate and send the pairing request packet. In an example, the first preset bit of the address 3 field may be bit0, the first preset value may be 1 (that is, bit0 is 1), the plurality of second preset bits of the address 3 field may be bit1 to bit4, the third preset value may be 0 (that is, bit1 to bit4 are all 0), and other bits of the address 3 field (that is, bit5 to bit47) may be reserved for encoding, so that the handshake frame carries the pairing related information, as shown in FIG. 2, which is a schematic diagram of a format of a pairing request packet according to an embodiment of the present disclosure. It should be noted that although the value of bit0 of the address 3 field defined by the 802.11 protocol is 1, which indicates a multicast address, the null data frame does not include a multicast address in actual use, so that this feature can be used to allow hardware and software to easily recognize that it is the packet defined in the present disclosure.

In addition, the format of the pairing approval packet can also be a null data frame defined by the 802.11 protocol. Specifically, returning, by the relay node, a pairing approval packet if it is the root node in step 140, comprises: filling, by the root node, an address 1 field in a null data frame with the MAC address of the node to be paired, filling an address 2 field with a MAC address of the root node, setting a first preset bit of an address 3 field to a first preset value to define the null data frame as a handshake frame, and setting a plurality of second preset bits of the address 3 field to a fourth preset value to define a type of the handshake frame as pairing approval, so as to generate and return the pairing approval packet. In an example, the first preset bit of the address 3 field may be bit0, the first preset value may be 1 (that is, bit0 is 1), the plurality of second preset bits of the address 3 field may be bit1 to bit4, the fourth preset value may be 1 (that is, bit1 to bit3 are all 0, and bit4 is 1), and other bits of the address 3 field (that is, bit5 to bit47) may be reserved for encoding, so that the handshake frame carries the pairing related information as shown in FIG. 3, which is a schematic diagram of a format of a pairing approval packet according to an embodiment of the present disclosure.

More specifically, the description of the method for pairing nodes shown in FIG. 1 is described below in conjunction with FIG. 4 to FIG. 7 as an embodiment.

Please refer to FIG. 4, which is a schematic diagram of a mesh network system according to an embodiment of the present disclosure. As shown in FIG. 4, the mesh network system 100 comprises an access point 200 and a plurality of network nodes, the plurality of network nodes can communicate with each other through the mesh network, and the plurality of network nodes comprise a plurality of relay nodes (i.e., the relay node 300a, the relay node 300b, and the relay node 300c), wherein the relay node 300a serves as the root node communicating with the access point 200, the parent node of the relay node 300c is the relay node 300b, and the parent node of the relay node 300b is the relay node 300a.

Figure 5:
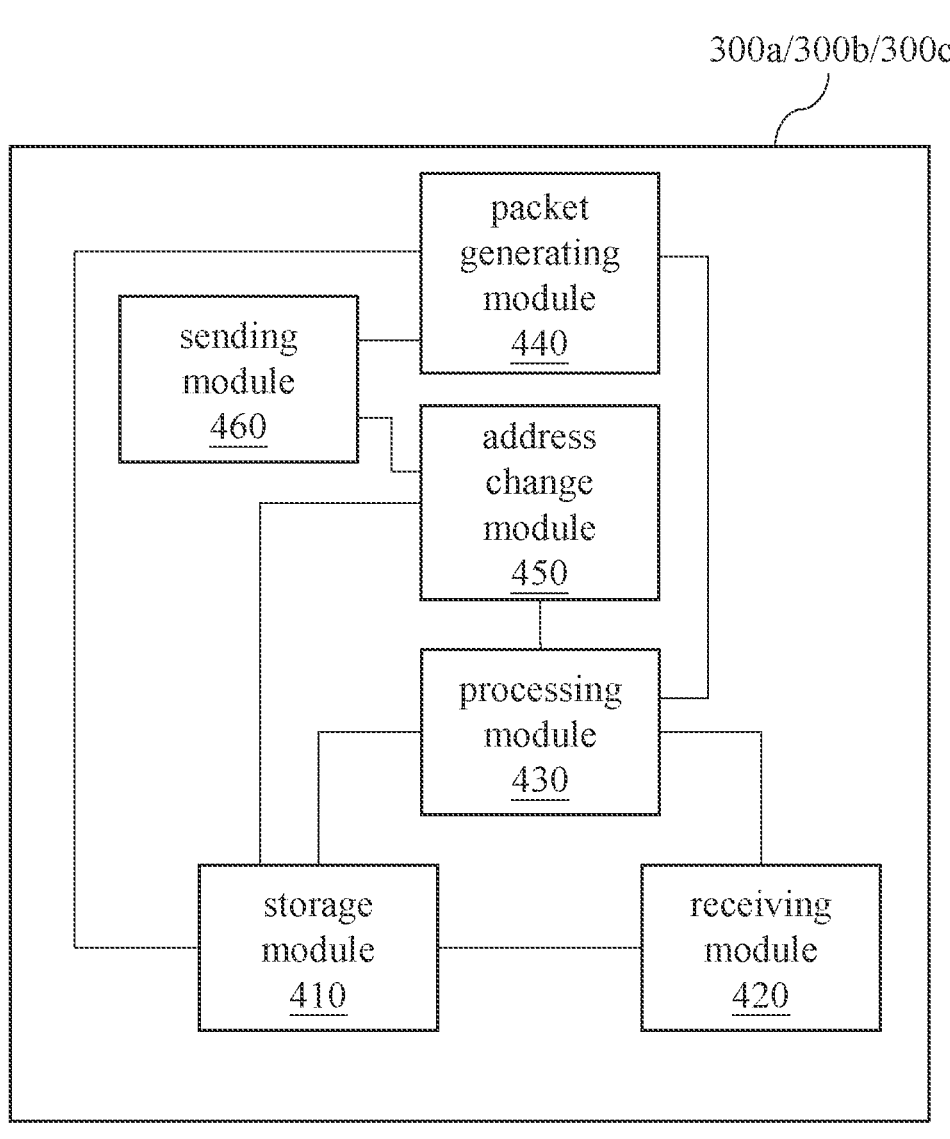
FIG. 5 is a schematic diagram of a relay node according to an embodiment of the present disclosure.

Please refer to FIG. 5, which is a schematic diagram of a relay node according to an embodiment of the present disclosure. The relay node 300a, the relay node 300b and the relay node 300c may all comprise: a storage module 410, a receiving module 420, a processing module 430, a packet generating module 440, an address change module 450 and a sending module 460, wherein the receiving module 420 is connected to the storage module 410, the processing module 430 is connected to the receiving module 420 and the storage module 410, the packet generation module 440 is connected to the processing module 430, the address change module 450 is connected to the storage module 410 and the processing module 430, the sending module 460 is connected to the address change module 450 and the packet generation module 440, and the storage module 410 is configured to store the refugee table. The receiving module 420, the processing module 430, the packet generating module 440, the address change module 450 and the sending module 460 may be implemented as software, hardware, and an appropriate combination thereof. The software module may be stored in a storage medium in the art, and do its work through the processor. For example, if the above-mentioned modules are all software modules, they can work by the same processor, or by different processors in any combination.

Figure 6:
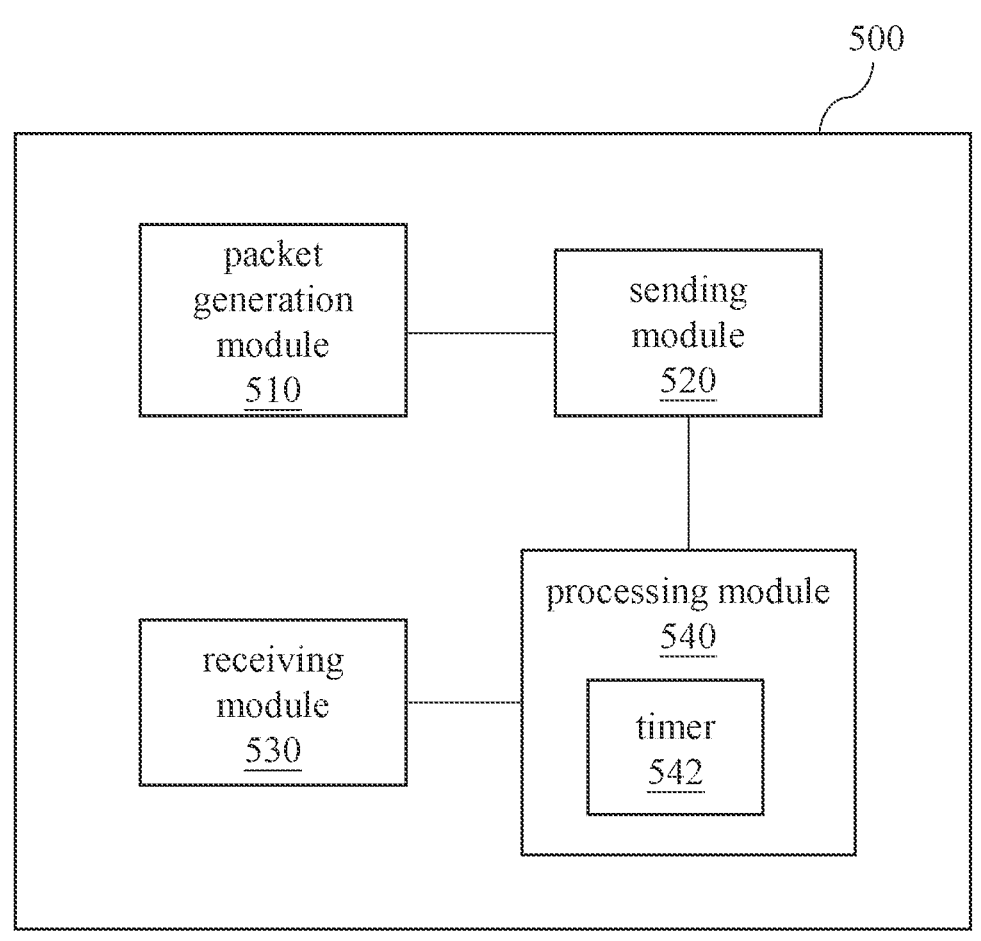
FIG. 6 is a schematic diagram of a node to be paired according to an embodiment of the present disclosure.

Please refer to FIG. 6, which is a schematic diagram of a node to be paired according to an embodiment of the present disclosure. The node to be paired 500 is a node that intends to join the mesh network system 100. The node to be paired 500 comprise a packet generation module 510, a sending module 520, a receiving module 530, and a processing module 540, wherein the sending module 520 is connected to the packet generation module 510, and the processing module 540 is connected to the sending module 520 and the receiving module 530, and the processing module 540 comprises a timer 542. The packet generation module 510, the sending module 520, the receiving module 530 and the processing module 540 can be implemented as software, hardware, and an appropriate combination thereof. The software module may be stored in a storage medium in the art, and do its work through the processor. For example, if the above-mentioned modules are all software modules, they can work by the same processor, or by different processors in any combination.

Figure 7:
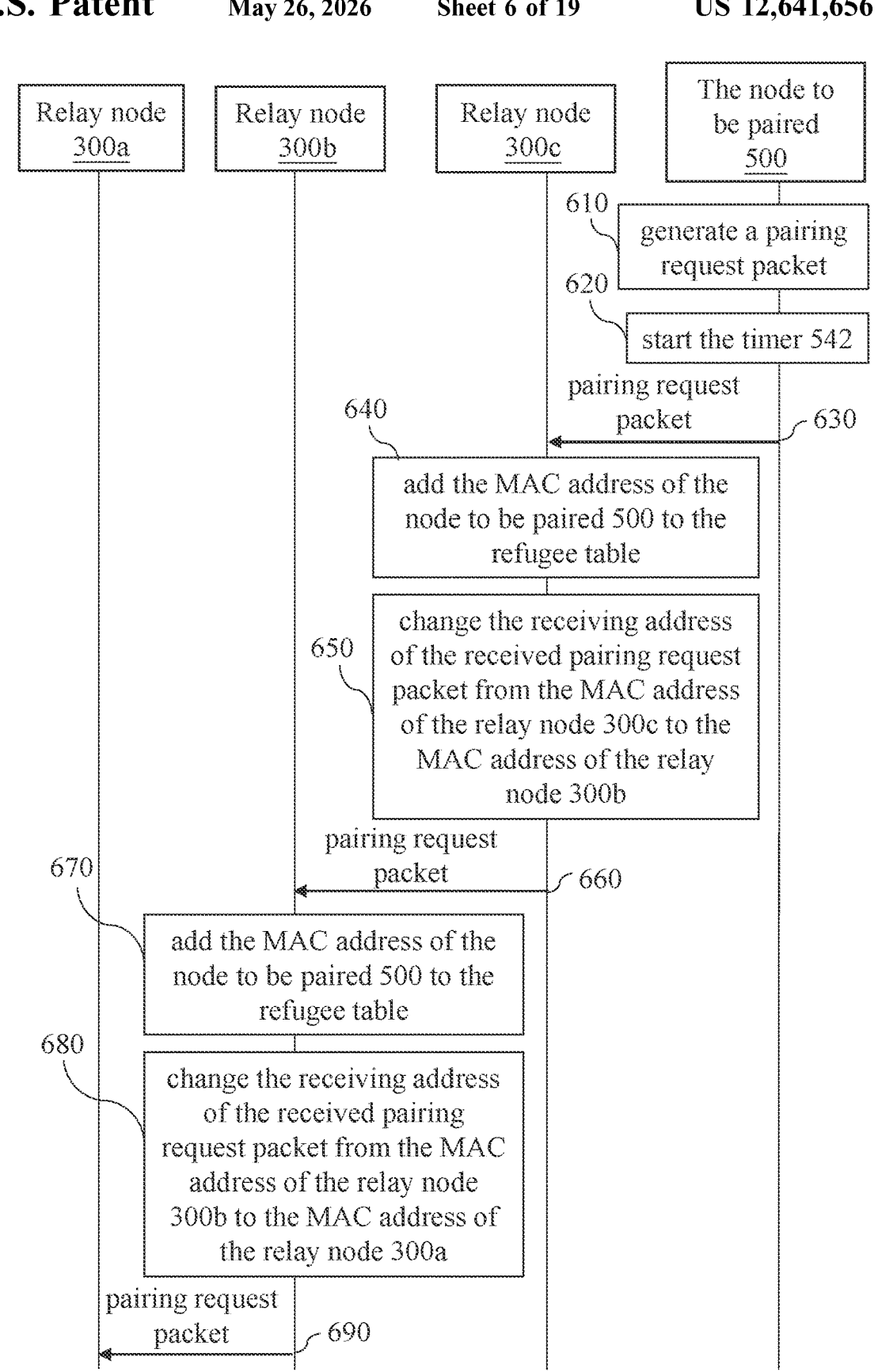
FIGS. 7 and 8 are a flowchart of a first embodiment of a method for pairing nodes in which the node to be paired in FIG. 6 joins the mesh network system in FIG. 4.
Figure 8:
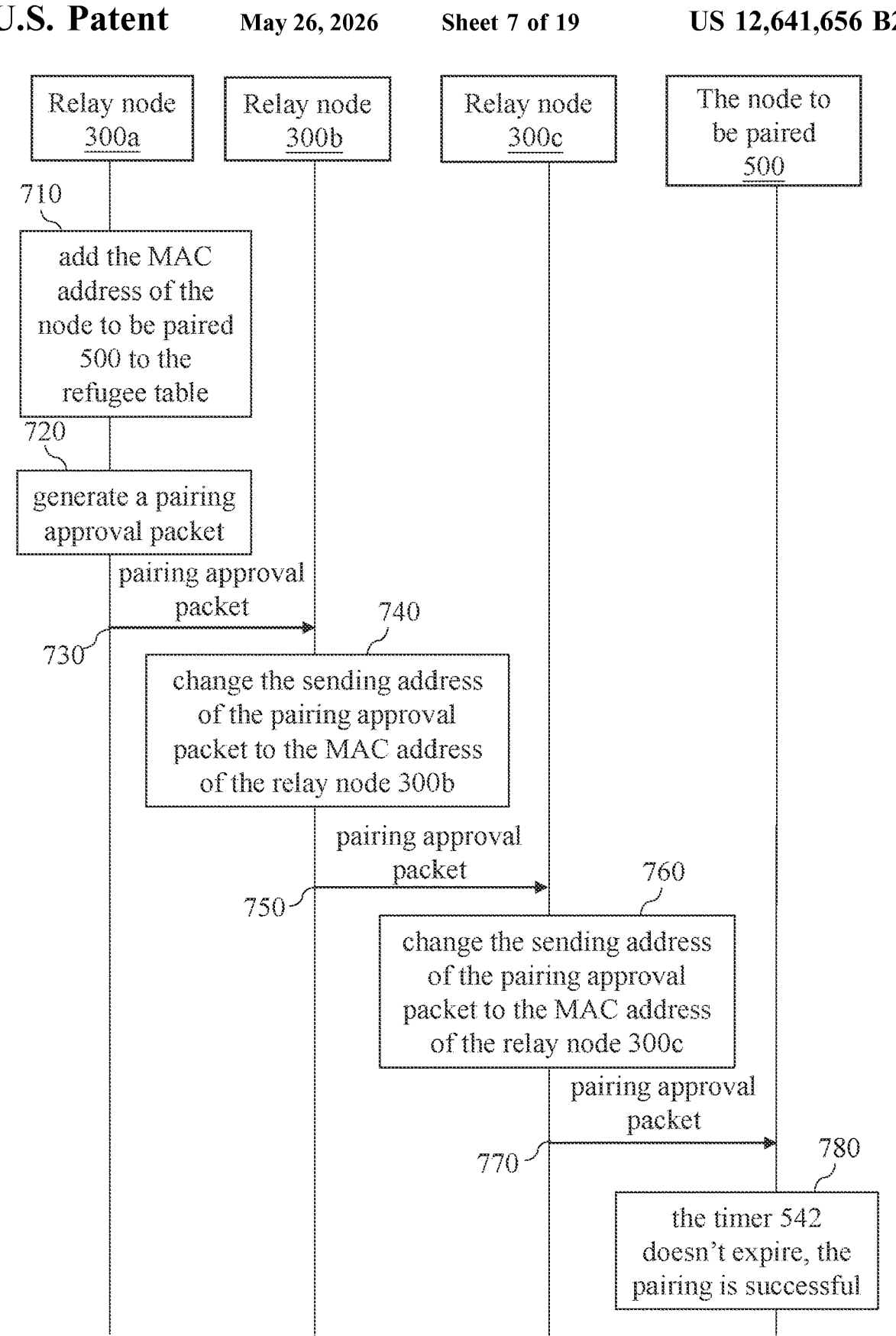

Please refer to FIG. 4 to FIG. 8, wherein FIGS. 7 and 8 are a flowchart of a first embodiment of a method for pairing nodes in which the node to be paired in FIG. 6 joins the mesh network system in FIG. 4. When the to-be-paired node 500 in FIG. 6 intends to join the mesh network system 100 in FIG. 4, the to-be-paired node 500 generates a pairing request packet by the packet generation module 510 thereof (step 610), the to-be-paired node 500 sends the pairing request packet to the relay node 300c by the sending module 520 thereof (step 620), and starts the timer 542 of the to-be-paired node 500 (step 630), wherein the parent node of the node to be paired 500 is the relay node 300c, the sending address of the pairing request packet is the MAC address of the node to be paired 500, and the receiving address of the pairing request packet is the MAC address of the relay node 300c. Since the receiving address of the pairing request packet is the MAC address of the relay node 300c, the relay node 300c receives the pairing request packet by the receiving module 420. When the processing module 430 of the relay node 300c determines that it can provide the relay service for the node to be paired 500, based on the sending address of the pairing request packet being the MAC address of the node to be paired 500, the MAC address of the node to be paired 500 is added to the refugee table stored in storage module 410 of the relay node 300c (step 640), and the relay node 300c determines whether it is the root node. When the processing module 430 of the relay node 300c determines that the relay node 300c is a non-root node, the relay node 300c changes the receiving address of the received pairing request packet from the MAC address of the relay node 300c to the MAC address of the relay node 300b by the address change module 450 thereof (step 650), and the sending module 460 of the relay node 300c sends the pairing request packet with the receiving address changed by the address change module 450 to the relay node 300b (step 660).

Since the receiving address of the pairing request packet is the MAC address of the relay node 300b, the relay node 300b receives the pairing request packet by the receiving module 420 thereof. When the processing module 430 of the relay node 300b determines that the relay node 300b can provide the relay service for the node to be paired 500, based on the sending address of the pairing request packet being the MAC address of the node to be paired 500, the MAC address of the node to be paired 500 is added to the refugee table stored in the storage module 410 of the relay node 300b (step 670). When the processing module 430 of the relay node 300b determines that the relay node 300b is a non-root node, the relay node 300b changes the receiving address of the received pairing request packet from the MAC address of the relay node 300b to the MAC address of the relay node 300a by the address change module 450 thereof (step 680), and the sending module 460 of the relay node 300b sends the pairing request packet whose receiving address is changed by the address change module 450 to the relay node 300a (step 690).

Since the receiving address of the pairing request packet is the MAC address of the relay node 300a, the relay node 300a receives the pairing request packet by the receiving module 420 thereof. When the processing module 430 of the relay node 300a determines that the relay node 300a can provide the relay service for the node to be paired 500, based on the sending address of the pairing request packet being the MAC address of the node to be paired 500, the MAC address of the node to be paired 500 is added to the refugee table stored in the storage module 410 of the relay node 300a (step 710). When the processing module 430 of the relay node 300a determines that the relay node 300a is the root node, the relay node 300a generates a pairing approval packet by the packet generation module 440 thereof (step 720), and the sending module 460 of the relay node 300a sends the pairing approval packet generated by the packet generation module 440 to the relay node 300b (step 730), wherein the receiving address of the pairing approval packet is the MAC address of the node to be paired 500 and the sending address of the pairing approval packet is the MAC address of the relay node 300a.

Since the sending address of the pairing approval packet is the MAC address of the relay node 300a, and the receiving address of the pairing approval packet is contained in the refugee table stored in the storage module 410 of the relay node 300b, the relay node 300b receives the pairing approval packet by the receiving module 420 thereof, and changes the sending address of the pairing approval packet to the MAC address of the relay node 300b by the address change module 450 thereof (step 740), and the sending module 460 of the relay node 300b sends the pairing approval packet whose sending address is changed by the address change module 450 to the relay node 300c (step 750). Since the sending address of the pairing approval packet is the MAC address of the relay node 300b, and the receiving address is contained in the refugee table stored in the storage module

410 of the relay node 300c, the relay node 300c receives the pairing approval packet by receiving module 420 thereof, and changes the sending address of the pairing approval packet to the MAC address of the relay node 300c by the address change module 450 thereof (step 760), and the sending module 460 of the relay node 300c sends the pairing approval packet whose sending address is changed by the address change module 450 to the node to be paired 500 (step 770).

Since the receiving address of the pairing approval packet is the MAC address of the node to be paired 500, the node to be paired 500 receives the pairing approval packet by the receiving module 530 thereof. If the receiving module 530 of the node to be paired 500 receives the pairing approval packet, and the timer 542 of the to-be-paired node 500 does not expire, it means that the pairing is successful (step 780) (that is, the node to be paired 500 successfully joins the mesh network system 100).

Please refer to FIG. 9, which is a flowchart of a method for pairing nodes according to a second embodiment of the present disclosure. In addition to the step 110 to step 160 described above, the method for pairing nodes may further comprise: returning, by the relay node receiving the pairing request packet, a pairing rejection packet when determining that it cannot provide the relay service for the node to be paired, wherein a receiving address of the pairing rejection packet is the MAC address of the node to be paired and a sending address of the pairing rejection packet is a MAC address of itself (step 170); and the pairing failing if the timer does not expire and the node to be paired receives the pairing rejection packet (step 190). It should be noted that, when the relay node determining that it cannot provide the relay service for the node to be paired and returning the pairing rejection packet is not the parent node of the node to be paired, the method for pairing nodes may further comprise after step 170 and before step 190: deleting, by the relay node receiving the pairing rejection packet, the MAC address of the node to be paired from a refugee table stored by itself when determining that the sending address of the pairing rejection packet is a MAC address of its parent node and the receiving address of the pairing rejection packet is contained in the refugee table stored by itself, and changing the sending address of the pairing rejection packet received to a MAC address of itself, and then forwarding the pairing rejection packet downlink until the pairing rejection packet is forwarded to the node to be paired (step 180).

The format of the pairing rejection packet may be a data frame defined by the 802.11 protocol, such as a management frame, a control frame, and other self-defined frames. In an embodiment, the format of the pairing rejection packet may also be a null data frame defined by the 802.11 protocol. Specifically, returning, by the relay node receiving the pairing request packet, a pairing rejection packet when determining that it cannot provide the relay service for the node to be paired in step 170, further comprises: filling, by the relay node receiving the pairing request packet, an address 1 field in a null data frame with the MAC address of the node to be paired, filling an address 2 field with a MAC address of itself, setting a first preset bit of an address 3 field to a first preset value to define the null data frame as a handshake frame, and setting a plurality of second preset bits of the address 3 field to a second preset value to define a type of the handshake frame as a pairing rejection, so as to generate and return the pairing rejection packet. In an example, the first preset bit of the address 3 field may be bit0, the first preset value may be 1, the plurality of second preset bits of the address 3 field may be bit1 to bit4, the second preset value may be 2 (that is, bit1, bit2, and bit4 are all 0, and bit3 is 1), and the other bits of the address 3 field (that is, bit5 to bit47) may be reserved for encoding, so that the handshake frame carries the pairing related information, as shown in FIG. 10, which is a schematic diagram of a format of a pairing rejection packet according to an embodiment of the present disclosure.

In an embodiment, the situation that the relay node determines that it cannot provide the relay service for the node to be paired may comprise but not limited to: (1) the situation where the storage capacity of the refugee table of the relay node has reached a upper limit value, so that the relay node can no longer provide relay services for more network nodes; (2) the situation where the relay node shuts down the relay service function; (3) the situation where the relay node is trying to switch to connect to other network nodes; and (4) the situation where the relay node has left the mesh network system.

It should be noted that, the relay node determining that it cannot provide the relay service for the node to be paired in step 170 may be a root node or a non-root node.

More specifically, the description of the method for pairing nodes shown in FIG. 9 is described below in conjunction with FIG. 4 to FIG. 6 and FIG. 11 as an embodiment.

Figure 11:
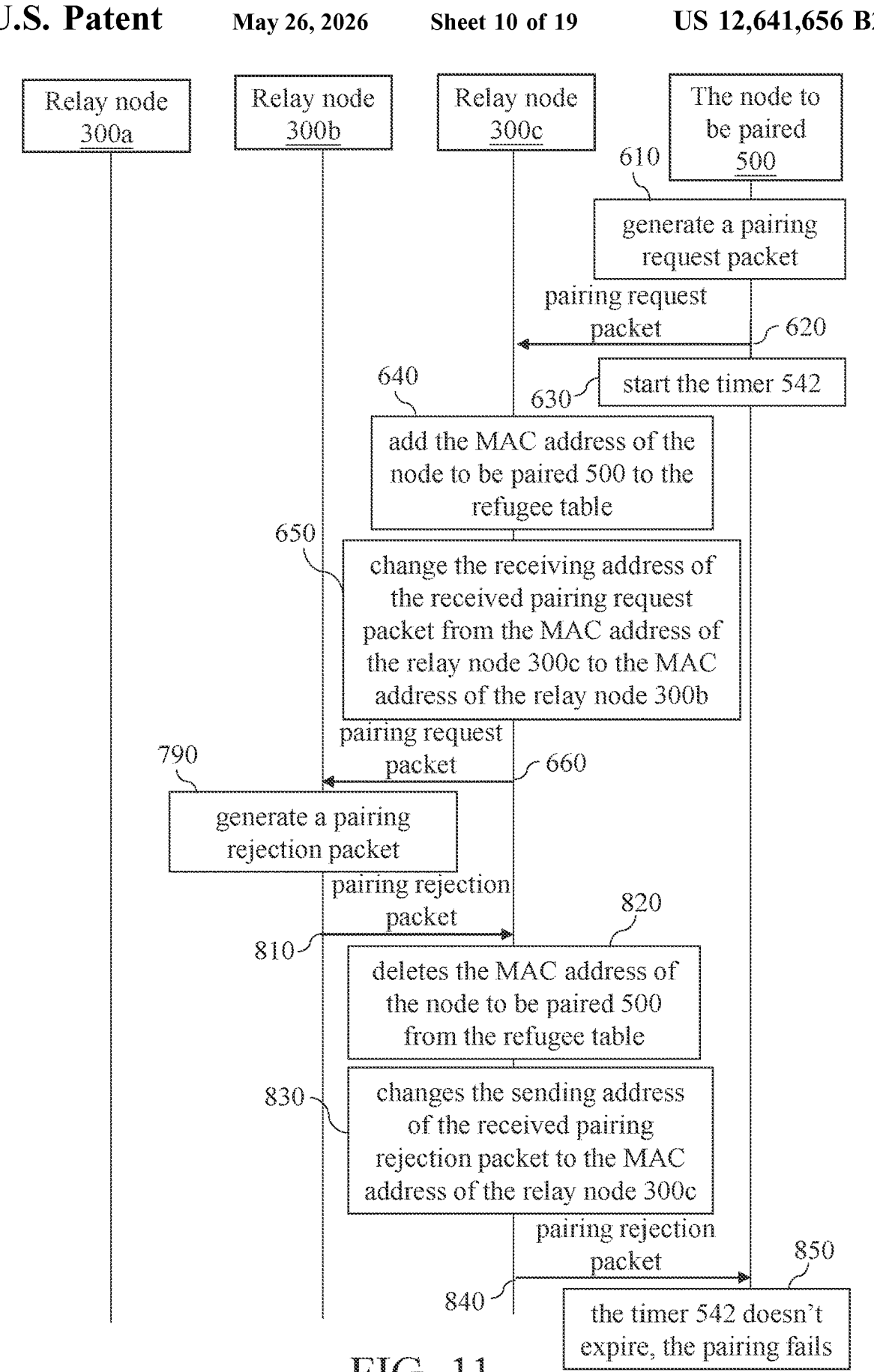
FIG. 11 is a flowchart of a second embodiment of a method for pairing nodes in which the node to be paired in FIG. 6 joins the mesh network system in FIG. 4.

Please refer to FIG. 4 to FIG. 6 and FIG. 11, wherein FIG. 11 is a flowchart of a second embodiment of a method for pairing nodes in which the node to be paired in FIG. 6 joins the mesh network system in FIG. 4. Since the difference between FIG. 11 and FIGS. 7-8 lies in the process after the relay node 300b determines that it cannot provide the relay service for the node to be paired 500, the description of the process from step 610 to step 660 will not be repeated. As shown in FIG. 11, after the relay node 300b determines that it cannot provide the relay service for the node to be paired 500 by the processing module 430 thereof, the relay node 300b generates a pairing rejection packet by the packet generation module 440 thereof (step 790), and sends the pairing rejection packet to the relay node 300c by the sending module 460 thereof (step 810), wherein the receiving address of the pairing rejection packet is the MAC address of the node to be paired 500 and the sending address of the pairing rejection packet is the MAC address of the relay node 300b. After the relay node 300c confirms that the sending address of the pairing rejection packet is the MAC address of its parent node by the processing module 430 thereof, and the receiving address of the pairing rejection packet is contained in the refugee table stored in the storage module 410 of the relay node 300c, the relay node 300c deletes the MAC address of the node to be paired 500 from the refugee table stored in the storage module 410 of the relay node 300c (step 820). Then, the relay node 300c changes the sending address of the received pairing rejection packet to the MAC address of the relay node 300c by the address change module 450 thereof (step 830). After that, the relay node 300c sends the pairing rejection packet whose sending address is changed by the address change module 450 to the node to be paired 500 by the sending module 460 thereof (step 840).

Since the receiving address of the pairing rejection packet is the MAC address of the node to be paired 500, the node to be paired 500 receives the pairing rejection packet by the receiving module 530 thereof. If the receiving module 530 of the node to be paired 500 receives the pairing rejection packet, and the timer 542 of the node to be paired 500 does not expire, it means that the pairing fails (step 850) (that is, the node to be paired 500 fails to join the mesh network system 100).

Figure 12:
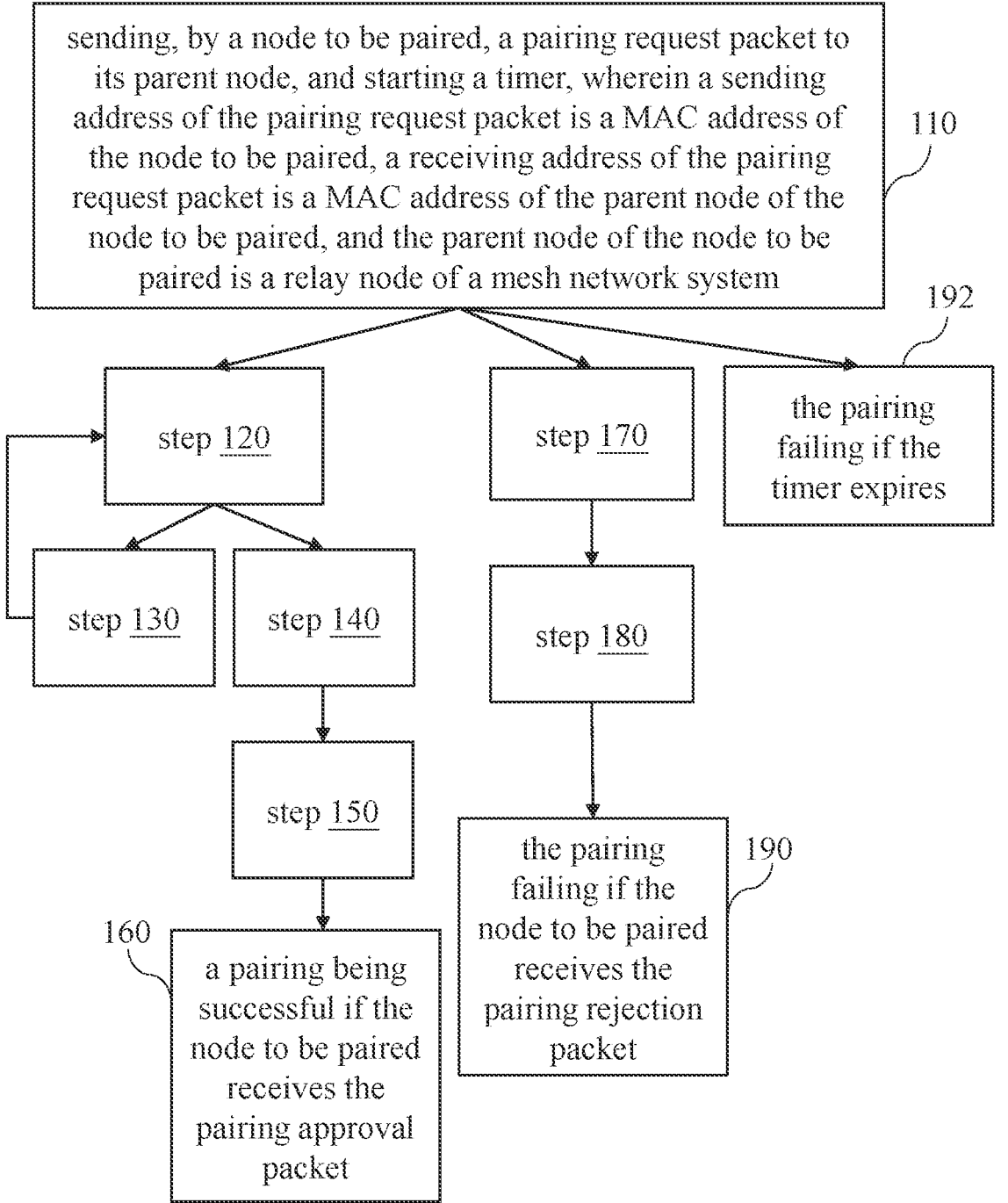
FIG. 12 is a flowchart of a method for pairing nodes according to a third embodiment of the present disclosure.

Please refer to FIG. 12, which is a flowchart of a method for pairing nodes according to a third embodiment of the present disclosure. In addition to step 110 to step 190, the method for pairing nodes may further comprise: the pairing failing if the timer expires (step 192). Specifically, if the timer expires and the node to be paired does not receive the pairing rejection packet or the pairing approval packet, it means that the pairing fails.

In one embodiment, please refer to FIG. 13, which is a flowchart of a method for pairing nodes according to a fourth embodiment of the present disclosure. Before step 110, the method for pairing nodes may further comprise: setting the node to be paired to only receive various types of packets that meet a filtering condition, wherein the filtering condition is that a sending address of each type of packets is the MAC address of the parent node of the node to be paired and a receiving address of each type of packets is the MAC address of the node to be paired (step 102).

In an embodiment, please refer to FIG. 13, before step 102, the method for pairing nodes may further comprise: obtaining, by the node to be paired, a received signal strength indication (RSSI) value between each relay node and an access point in the mesh network system and a RSSI value between the node to be paired and each relay node based on multiple beacon packets or multiple probe response packets obtained by a scanning procedure (step 104); and selecting, by the node to be paired, a relay node as its parent node based on the RSSI value between each relay node and the access point and the RSSI value between the node to be paired and each relay node (step 106).

In an example, the scanning procedure is that the node to be paired actively detects and searches each relay node of the mesh network system. Specifically, the node to be paired may send probe request frames sequentially on the channels it supports, wherein the probe request frame does not carry the SSID but may comprise vendor-defined information elements (Vendor IEs), such as the BSSID and the information requesting assistance, to detect all available relay nodes around. The relay node receiving the probe request frame sends a probe response frame to the node to be paired, wherein the probe response frame may comprise Vendor IEs, such as the BSSID, the RSSI value between itself and the access point, the MAC address of the root node it is connected to, the number of levels it is at in the mesh network system, the number of descendant nodes that provided with relay services by itself, and information that it can provide assistance. Therefore, the node to be paired can receive the probe response frame sent by each relay node through the above scanning procedure, and obtain the RSSI value between itself and each relay node and the RSSI value between each relay node and the access point, and then select a relay node as its parent node. For example, the node to be paired first selects the relay node with the best RSSI value as its parent node, but if the RSSI value between the selected relay node and the parent node thereof is poor or the RSSI value between the nodes on the uplink path of the selected relay node is poor, the node to be paired chooses the relay node with the second best RSSI value as its parent node, and so on, until the node to be paired selects a suitable relay node as its parent node.

In another example, the scanning procedure is that the node to be paired passively receives the beacon frame sent by each relay node of the mesh network system. Specifically, each relay node of the mesh network system periodically broadcasts the beacon frame, and the node to be paired can listen to the beacon frames on each channel it supports, wherein the beacon frame can comprise Vendor IEs, such as the BSSID, the RSSI value between itself and the access point, the MAC address of the root node it is connected to, the number of levels it is at in the mesh network system, the number of descendant nodes that provided with relay services by itself, and information that it can provide assistance. Therefore, the node to be paired can receive the probe response frame sent by each relay node through the above scanning procedure, and obtain the RSSI value between the node to be paired and each relay node and the RSSI value between each relay node and the access point, and then select a relay node as its parent node.

In one embodiment, since the relay node serving as the root node in the mesh network system has the largest load, the method for pairing nodes described in FIG. 1 can be modified so that only the relay node as the root node can determine whether it can provide the relay service for the node to be paired. Specifically, please refer to FIG. 14, which is a flowchart of a method for pairing nodes according to a fifth embodiment of the present disclosure. As shown in FIG. 14, the method for pairing nodes comprises: sending, by a node to be paired, a pairing request packet to its parent node, and starting a timer, wherein a sending address of the pairing request packet is the MAC address of the node to be paired, a receiving address of the pairing request packet is the parent node of the node to be paired, and the parent node of the node to be paired is a relay node of a mesh network system (step 210); adding, by the relay node receiving the pairing request packet, the MAC address of the node to be paired to a refugee table stored by itself when it is a non-root node, changing the receiving address of the pairing request packet to a MAC address of its parent node, and then forwarding the pairing request packet uplink, until the relay node receiving the pairing request packet is a root node (step 220); when the relay node receiving the pairing request packet is the root node, adding, the MAC address of the node to be paired to a refugee table stored by itself after determining that it can provide a relay service for the node to be paired, and returning a pairing approval packet, wherein a receiving address of the pairing approval packet is the MAC address of the node to be paired (step 230); changing, by a relay node receiving the pairing approval packet, a sending address of the pairing approval packet to a MAC address of itself when confirming that the sending address of the pairing approval packet is the MAC address of its parent node, and then forwarding the pairing approval packet downlink, until the pairing approval packet is forwarded to the node to be paired (step 240); and a pairing being successful if the node to be paired receives the pairing approval packet (step 250). It should be noted that, when the parent node of the node to be paired is the root node, step 220 and step 240 may be omitted.

In an embodiment, please refer to FIG. 15, which is a flowchart of a method for pairing nodes according to a sixth embodiment of the present disclosure. As shown in FIG. 15, in addition to step 210 to step 250, the method for pairing nodes may further comprise: when the relay node receiving the pairing request packet is the root node, returning a pairing rejection packet after determining that it cannot provide the relay service for the node to be paired, wherein a receiving address of the pairing rejection packet is the MAC address of the node to be paired, and a sending address of the pairing rejection packet is a MAC address of itself (step 260); deleting, by a relay node receiving the pairing approval packet, the MAC address of the node to be paired from the refugee table stored by itself when confirming that the sending address of the pairing rejection packet is the MAC address of its parent node, and changing the sending address of the pairing rejection packet to a MAC address of itself, and then forwarding the pairing rejection packet downlink, until the pairing rejection packet is forwarded to the node to be paired (step 270); and the pairing failing if the node to be paired receives the pairing rejection packet (step 280). It should be noted that the relay node, which determines that it cannot provide the relay service for the node to be paired and returns the pairing rejection packet, is the parent node of the node to be paired (that is, the root node is the parent node of the node to be paired), step 270 can be omitted.

In an embodiment, the method for pairing nodes described in FIG. 15 may further comprise: the pairing failing if the timer expires (step 290). Specifically, if the timer expires and the node to be paired does not receive a pairing rejection packet or a pairing approval packet, it means that the pairing fails.

In one embodiment, the relay node as a non-root node can first return the pairing approval packet to the node to be paired, and then notify its upper-level nodes that the node to be paired joins the mesh network system. Specifically, please refer to FIG. 16, which is a flowchart of a method for pairing nodes according to a seventh embodiment of the present disclosure. As shown in FIG. 16, the method for pairing nodes comprises: sending, by a node to be paired, a pairing request packet to its parent node, and starting a timer, wherein a sending address of the pairing request packet is a MAC address of the node to be paired, a receiving address of the pairing request packet is the parent node of the node to be paired, and the parent node of the node to be paired is a relay node of a mesh network system (step 310); adding, by a relay node receiving the pairing request packet, the MAC address of the node to be paired to a refugee table stored by itself after determining that it can provide a relay service for the node to be paired, and returning a pairing approval packet to the node to be paired, wherein a receiving address of the pairing approval packet is the MAC address of the node to be paired (step 320); if the relay node receiving the pairing request packet is a non-root node, sending, by the relay node receiving the pairing request packet, a pairing notification packet whose receiving address is a MAC address of its parent node and whose source address is the MAC address of the node to be paired, so that the parent node of the relay node receiving the pairing request packet adds the MAC address of the node to be paired to a refugee table stored by itself after receiving the pairing notification packet, and changes the receiving address of the pairing notification packet to a MAC address of its parent node, and then forwards the pairing notification packet uplink, until the pairing notification packet is forwarded to the root node (step 330); adding, by the relay node receiving the pairing request packet, the MAC address of the node to be paired to a refugee table stored by itself if it is a root node (step 340); and a pairing being successful if the node to be paired receives the pairing approval packet (step 350). It should be noted that, when the parent node of the node to be paired is the root node, step 330 and step 340 may be omitted.

The format of the pairing notification packet may be a data frame defined by the 802.11 protocol, such as a management frame, a control frame, and other self-defined frames. In an embodiment, the format of the pairing notification packet may also be a null data frame defined by the 802.11 protocol, and the relay node that determines that it can provide the relay service for the node to be paired may fill the address 1 field in the null data frame with the MAC address of its parent node, fill the address 2 field with a MAC address of itself, and fill the address 3 field with the MAC address of the node to be paired, so as to generate and return the pairing notification packet.

In an embodiment, please refer to FIG. 17, which is a flowchart of a method for pairing nodes according to an eighth embodiment of the present disclosure. As shown in FIG. 17, the method for pairing nodes comprises step 310 to step 350, and may further comprise: returning, by the relay node receiving the pairing request packet, a pairing rejection packet to the node to be paired after determining that it cannot provide the relay service for the node to be paired, wherein a receiving address of the pairing rejection packet is the MAC address of the node to be paired, and a sending address of the pairing rejection packet is a MAC address of itself (step 360); and the pairing failing if the node to be paired receives the pairing rejection packet (step 370).

In an embodiment, the method for pairing nodes described in FIG. 17 may further comprise: the pairing failing if the timer expires (step 380). Specifically, if the timer expires and the node to be paired does not receive a pairing rejection packet or a pairing approval packet, it means that the pairing fails.

Through the method for pairing nodes described in FIG. 1, FIG. 9 and FIG. 12 to FIG. 17, the network node as a non-root node (that is, the node to be paired) can confirm its parent node and join the mesh network system, make each relay node of the mesh network system update the content of the refugee table stored by itself, to construct the mesh network system, and is applied to the following data transmission method.

Please refer to FIG. 18, which is a flowchart of a data transmission method according to a first embodiment of the present disclosure. The data transmission method comprises: generating a packet by a station, wherein a sending address of the packet is a MAC address of the station and a receiving address of the packet is a MAC address of an access point (step 1010); changing the receiving address of the packet to a MAC address of its parent node by the station, and then sending the packet (step 1020); transmitting an acknowledgment (ACK) frame by a relay node that receives the packet, changing the receiving address of the packet to a MAC address of its parent node, and then forwarding the packet uplink until the packet is forwarded to the access point (step 1030); and transmitting an ACK frame by the access point after receiving the packet, parsing the packet, and determining that it receives data from the station based on the sending address of the packet (step 1040).

Generally, network integrated circuits (ICs) mainly process data in a physical layer (i.e., Layer 1) and a data link layer (i.e., Layer 2) with hardware, and process data in above Layer 3 with software. However, with the increasing demand for bandwidth, the requirements for the transmission rate of routers have also increased significantly. Therefore, it is also possible to choose to process the data of the third layer by hardware for the network ICs. In this embodiment, the station can include a software layer and a hardware layer, so in step 1010, the station can generate a packet by the software layer, and in step 1020, the station can change the receiving address of the packet to the MAC address of its parent node by the hardware layer, and then send the packet. In another embodiment, the station can change the receiving address of the packet to the MAC address of its parent node by the software layer, and then send the packet.

In one embodiment, the format of the packet generated by the software layer of the station may use a frame defined by the 802.11 protocol, such as a data frame, a management frame, a control frame, and other self-defined frames.

In one embodiment, the format of the packet generated by the software layer of the station may be a data frame defined by the 802.11 protocol, and the data frame comprises a frame control field, a duration field, an address 1 field, an address 2 field, an address 3 field, a sequence control field, an address 4 field, a quality of service (QoS) control field, a high throughput (HT) control field, a frame body field, and a frame check sequence (FCS) field, as shown in FIG. 19, which is a schematic diagram of a format of a packet generated by a station according to an embodiment of the present disclosure. Specifically, the software layer of the station fills the address 1 field in the data frame with the MAC address of the access point, and fills the address 2 field with the MAC address of itself to generate the packet, but this embodiment is not intended to limit the present disclosure. For example, the software layer of the station fills the address 3 field in the data frame with the MAC address of the access point, and fills the address 4 field with the MAC address of itself to generate the packet (that is, the address 3 field is filled with the receiving address, and the address 4 field is filled with the sending address).

In one embodiment, in order to consider the security of data transmission, the data transmission method may be further performed by encrypting the packet at the station, and decrypting the packet at the access point. Specifically, when the encryption and decryption method is performed by using the Temporal Key Integrity Protocol (TKIP), the Counter Mode Cipher Block Chaining Message Authentication Protocol (CCMP) or the Wired Equivalent Privacy Protocol (WEP), step 1010 may comprise: generating the packet by the software layer of the station, and then encrypting the packet, or step 1020 may comprise: changing, by the hardware layer of the station, the receiving address of the packet to the MAC address of its parent node after the hardware layer of the station encrypts the packet, and then sending the packet; step 1040 may comprise: decrypting, by the access point, the packet received, and then determining that it receives the data from the station based on the sending address of the packet being the MAC address of the station. In an example, the station may encrypt the packet by the software layer or the hardware layer, then change the receiving address of the packet to the MAC address of its parent node, and then send the packet.

In another embodiment, when the encryption and decryption method is performed by using the TKIP or WEP, step 1020 may comprise: encrypting, by the station, the packet after the hardware layer of the station changes the receiving address of the packet to the MAC address of its parent node, and then sending the packet; step 1040 may comprise: decrypting, by the access point, the packet received, and then determining that it receive the data from the station based on the sending address of the packet being the MAC address of the station.

In one embodiment, in order to ensure the correctness and integrity of data transmission, the data transmission method may use a cyclic redundancy check (CRC) algorithm to check the packet. Specifically, step 1020 may comprise: performing, by the station, CRC calculation on the packet, and fill a calculated CRC code into the packet after the hardware layer of the station changes the receiving address of the packet to the MAC address of its parent node, and then sending the packet; step 1030 may comprise: performing, by the relay node receiving the packet, CRC check on the packet, returning an ACK frame when the packet passes the CRC check, changing the receiving address of the packet received to the MAC address of its parent node, performing CRC calculation on the packet, filling a calculated CRC code into the packet, and then forwarding the packet uplink until the packet is forwarded to the access point; step 1040 may comprise: performing, by the access point, CRC check on the packet after the access point receives the packet, returning an ACK frame when the packet passes the CRC check, and then parsing the packet to obtain the data from the station.

In another embodiment where the CRC check algorithm is used to check the packet, step 1020 may comprise: performing, by the station, CRC calculation on the packet, filling a calculated CRC code into the packet, changing the receiving address of the packet to the MAC address of its parent node, and then sending the packet; step 1030 may comprise: changing, by the relay node receiving the packet, the receiving address of the packet to the MAC address of the access point, performing CRC check on the packet, returning an ACK frame when the packet passes the CRC check, changing the receiving address of the packet to the MAC address of its parent node (the packet retains the original CRC code), and then forwarding the packet uplink until the packet is forwarded to the access point; step 1040 may comprise: performing, by the access point, CRC check on the packet after the access point receives the packet, returning an ACK frame when the packet passes the CRC check, and then parsing the packet to obtain the data from the station.

In one embodiment, in order to consider the security, correctness and integrity of data transmission at the same time, the data transmission method may comprise the encryption and decryption of the data field of the packet and the check of the packet by using the CRC algorithm.

Please refer to FIG. 20, which is a flowchart of a data transmission method according to a second embodiment of the present disclosure. The data transmission method comprises: sending a packet by an access point, wherein a receiving address of the packet is a MAC address of a station and a sending address of the packet is a MAC address of the access point (step 2010); receiving the packet by a relay node based on the MAC address of the station contained in a refugee table stored by itself and the sending address of the packet being a MAC address of its parent node, transmitting an ACK frame to its parent node, and then changing the sending address of the packet to a MAC address of itself and forwarding the packet downlink until the packet is forwarded to the station, wherein the refugee table stored in the relay node contains MAC addresses of all descendant nodes that provided with relay services by the relay node (step 2020); and receiving the packet by the station based on the sending address of the packet being the MAC address of its parent node and the receiving address of the packet being the MAC address of the station, transmitting an ACK frame, changing the sending address of the packet to the MAC address of the access point, and then determining that it receives data from the access point based on the sending address of the packet (step 2030).

In one embodiment, the format of the packet sent by the access point may be a data frame defined by the 802.11 protocol, such as a management frame, a control frame, and other self-defined frames.

In one embodiment, the station may include a hardware layer and a software layer, so in step 2030, the station may receive the packet by the hardware layer, transmit the ACK frame, and change the sending address of the received packet to the MAC address of the access point and then transmit the packet to the software layer, and the software layer of the station may determines to receive data from the access point based on the sending address of the packet.

In one embodiment, the format of the packet sent by the access point may be a data frame defined by the 802.11 protocol as shown in FIG. 19. Specifically, the access point fills the address 1 field in the data frame with the MAC address of the station, and fills the address 2 field with the MAC address of itself to generate the packet, but this embodiment is not intended to limit the present disclosure. For example, the access point fills the address 3 field in the data frame with the MAC address of the station, and fills the address 4 field with the MAC address of itself to generate the packet (that is, the address 3 field is filled with the receiving address, and the address 4 field is filled with the sending address).

In one embodiment, in order to consider the security of data transmission, the data transmission method may be further performed by encrypting the packet at the access point, and decrypting the packet at the station. Specifically, step 2010 may comprise: encrypting, by the access point, the packet, and then sending the packet; step 2030 may comprise: changing, by the station, the sending address of the packet to the MAC address of the access point after the station decrypts the packet, and then determining that it receives the data from the access point based on the sending address of the packet. In another embodiment, step 2010 may comprise: encrypting, by the access point, the packet and then sending the packet; step 2030 may comprise: changing, by the station, the sending address of the received packet to the MAC address of the access point; and decrypting, by the station, the packet, and determining that it receive the data from the access point based on the sending address of the packet.

In one embodiment, in order to ensure the correctness and integrity of data transmission, the data transmission method may use the CRC algorithm to check the packet. Specifically, step 2010 may comprise: performing, by the access point, CRC calculation on the packet, filling a calculated CRC code into the packet, and then sending the packet; step 2020 may comprise: performing, by the relay node receiving the packet, CRC check on the packet, returning an ACK frame when the packet passes the CRC check, changing the sending address of the packet to the MAC address of itself, performing CRC calculation on the packet, filling a calculated CRC code into the packet, and then forwarding the packet downlink; step 2030 may comprise: performing, by the station, CRC check on the packet, returning an ACK frame when the packet passes the CRC check, changing the sending address of the packet to the MAC address of the access point, and then determining that it receives the data from the access point based on the sending address of the packet. In an example of step 2030, the station can perform the CRC check on the packet by the hardware layer, return the ACK frame when the packet passes the CRC check, and change the sending address of the received packet to the MAC address of the access point by the hardware layer or the software layer, and the software layer of the station determines to receive data from the access point based on the sending address of the packet.

In another embodiment where the CRC check algorithm is used to check the packet, step 2010 may comprise: performing, by the access point, CRC calculation on the packet, filling a calculated CRC code into the packet, and then sends the packet; step 2020 may comprise: performing, by the relay node receiving the packet, CRC check on the packet, returning an ACK frame when the packet passes CRC check, changing the sending address of the packet to the MAC address of itself (the packet retains the original CRC code) and then forwarding the packet downlink; step 2030 may comprise: changing, by the station, the sending address of the packet to the MAC address of the access point, performing CRC check on the packet, returning an ACK frame when the packet passes the CRC check, and then determining that it receives the data from the access point based on the sending address of the packet that passes the CRC check.

In one embodiment, in order to consider the security, correctness and integrity of data transmission at the same time, the data transmission method may comprise the encryption and decryption of the data field of the packet and the check of the packet by using the CRC algorithm.

It should be noted that, if there is no causal relationship between the above steps, the present disclosure does not limit the order of execution thereof.

To sum up, in the embodiments of the present disclosure, only the interaction of two packets (i.e., the pairing request packet and the pairing approval packet) is required between a node to be paired and its parent node (that is, the relay node of the mesh network system), so that the node to be paired can quickly and efficiently join the mesh network system. In addition, the relay node as a non-root node performs uplink data forwarding by changing the receiving address of the pairing request packet received, or changing the sending address of the pairing approval packet received for downlink data forwarding, so that there is no need to encrypt and decrypt the pairing request packet or the pairing approval packet, which effectively improves the forwarding efficiency. Besides, in the method for pairing nodes, the relay node only needs to maintain a refugee table containing the MAC addresses of all subordinate nodes that it can provide relay services for, and does not need to maintain a routing table containing path information to a specific relay node. The amount of data stored in the refugee table is smaller than that in the routing table, and the cache requirements for relay nodes are also relatively small, so that the refugee table is suitable for a mesh network system with many network nodes, and the efficiency of downlink forwarding can be more effectively improved by quickly confirming whether there is a MAC address of the node to be paired in the refugee table. Moreover, the format of each of the pairing request packet, the pairing approval packet, the pairing rejection packet and the pairing notification packet can be a data frame defined by the 802.11 protocol, such as a management frame, a control frame, and other self-defined frames, and the pairing request packet, the pairing approval packet, the pairing rejection packet and the pairing notification packet can use the same type of packet having different meanings or use different types of packets.

Although the above-described components are included in the drawings of the present disclosure, it is not excluded to use more other additional components to achieve better technical effects without departing from the spirit of the invention. While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A method for pairing nodes, comprising:
sending, by a node to be paired, a pairing request packet to its parent node, wherein a sending address of the pairing request packet is a MAC address of the node to be paired, a receiving address of the pairing request packet is a MAC address of the parent node of the node to be paired, and the parent node of the node to be paired is a relay node of a mesh network system,
filling, by the node to be paired, an address 1 field in a null data frame with the MAC address of the parent node of the node to be paired, filling an address 2 field with the MAC address of the node to be paired, setting a first preset bit of the address 3 field to a first preset value to define the null data frame as a handshake frame, setting a plurality of second preset bits of an address 3 field to a third preset value to define a type of the handshake frame as a pairing request, so as to generate and send the pairing request packet;
adding, by a relay node, the MAC address of the node to be paired to a refugee table maintained by the relay node, after the relay node receiving the pairing request packet determines that it can provide a relay service for the node to be paired, wherein the refugee table is a table that stores MAC addresses of all subordinate nodes for which the relay node provides relay services;
changing, by the relay node, the receiving address of the pairing request packet received to a MAC address of its parent node if the relay node is a non-root node, and then forwarding the pairing request packet uplink, until the relay node receiving the pairing request packet is a root node; and
returning, by the relay node, a pairing approval packet if the relay node is the root node, wherein a receiving address of the pairing approval packet is the MAC address of the node to be paired, and a sending address of the pairing approval packet is a MAC address of itself;
wherein a pairing is successful if the node to be paired receives the pairing approval packet.

2. The method for pairing nodes according to claim 1, further comprising:
changing, by the relay node receiving the pairing approval packet, the sending address of the pairing approval packet to a MAC address of itself when it confirms that the sending address of the pairing approval packet is a MAC address of its parent node and the receiving address is contained in the refugee table stored by itself, and then forwarding the pairing approval packet downlink, until the pairing approval packet is forwarded to the node to be paired.

3. The method for pairing nodes according to claim 1, further comprising:
returning, by the relay node receiving the pairing request packet, a pairing rejection packet when it determines that it cannot provide the relay service for the node to be paired, wherein a receiving address of the pairing rejection packet is the MAC address of the node to be paired, and a sending address of the pairing rejection packet is a MAC address of itself;
wherein the pairing fails if the node to be paired receives the pairing rejection packet.

4. The method for pairing nodes according to claim 3, wherein the pairing fails if it times out.

5. The method for pairing nodes according to claim 3, wherein the returning, by the relay node receiving the pairing request packet, the pairing rejection packet when it determines that it cannot provide the relay service for the node to be paired further comprises:
filling, by the relay node receiving the pairing request packet, an address 1 field in a null data frame with the MAC address of the node to be paired, filling an address 2 field with the MAC address of the root node, setting a first preset bits of an address 3 field to a first preset value to define the null data frame as a handshake frame, and setting a plurality of second preset bits of the address 3 field to a second preset value to define a type of the handshake frame as a pairing rejection, so as to generate and return the pairing rejection packet.

6. The method for pairing nodes according to claim 1, further comprising:

setting the node to be paired to only receive various types of packets that meet a filtering condition, wherein the filtering condition is that a sending address of each type of packets is the MAC address of the parent node of the node to be paired and a receiving address of each type of packets is the MAC address of the node to be paired.

7. The method for pairing nodes according to claim 1, further comprising:

obtaining, by the node to be paired, a received signal strength indication (RSSI) value between each relay node and an access point in the mesh network system and a RSSI value between the node to be paired and each relay node based on multiple beacon packets or multiple probe response packets obtained by a scanning procedure; and selecting, by the node to be paired, a relay node as its parent node based on the RSSI value between each relay node and the access point and the RSSI value between the node to be paired and each relay node.

8. The method for pairing nodes according to claim 1, wherein the returning, by the relay node, a pairing approval packet if the relay node is the root node further comprises:

filling, by the root node, an address 1 field in a null data frame with the MAC address of the node to be paired, filling an address 2 field with the MAC address of the root node, setting a first preset bit of an address 3 field to a first preset value to define the null data frame as a handshake frame, setting a plurality of second preset bits of the address 3 field to a fourth preset value to define a type of the handshake frame as pairing approval, so as to generate and return the pairing approval packet.

9. A method for pairing nodes, comprising:

sending, by a node to be paired, a pairing request packet to its parent node, wherein a sending address of the pairing request packet is the MAC address of the node to be paired, a receiving address of the pairing request packet is the parent node of the node to be paired, and the parent node of the node to be paired is a relay node of a mesh network system;

adding, by the relay node receiving the pairing request packet, the MAC address of the node to be paired to a refugee table maintained by the relay node, when the relay node is a non-root node, changing the receiving address of the pairing request packet to a MAC address of the relay node's parent node, and then forwarding the pairing request packet uplink, until the relay node receiving the pairing request packet is a root node;

when the relay node receiving the pairing request packet is the root node, adding, the MAC address of the node to be paired to a refugee table stored by itself after determining that it can provide a relay service for the node to be paired, and returning a pairing approval packet, wherein a receiving address of the pairing approval packet is the MAC address of the node to be paired, a sending address of the pairing approval packet is a MAC address of itself, and the refugee table contains MAC addresses of all subordinate nodes that the relay node provides relay services for; and changing, by a relay node receiving the pairing approval packet, the sending address of the pairing approval packet to a MAC address of itself when confirming that the sending address of the pairing approval packet is the MAC address of its parent node, and then forwarding the pairing approval packet downlink, until the pairing approval packet is forwarded to the node to be paired;

wherein a pairing is successful if the node to be paired receives the pairing approval packet;

when the relay node receiving the pairing request packet is the root node, returning a pairing rejection packet after determining that it cannot provide the relay service for the node to be paired, wherein a receiving address of the pairing rejection packet is the MAC address of the node to be paired, and a sending address of the pairing rejection packet is a MAC address of itself;

deleting, by a relay node receiving the pairing approval packet, the MAC address of the node to be paired from the refugee table stored by itself when confirming that the sending address of the pairing rejection packet is the MAC address of its parent node, and changing the sending address of the pairing rejection packet to a MAC address of itself, and then forwarding the pairing rejection packet downlink, until the pairing rejection packet is forwarded to the node to be paired;

wherein the pairing fails if the node to be paired receives the pairing rejection packet.

10. The method for pairing nodes according to claim 9, wherein the pairing fails if it times out.

11. A method for pairing nodes, comprising:

sending, by a node to be paired, a pairing request packet to its parent node, wherein a sending address of the pairing request packet is a MAC address of the node to be paired;

wherein a receiving address of the pairing request packet is a MAC address of the parent node of the node to be paired, and wherein the parent node of the node to be paired is a relay node of a mesh network system, wherein the sending, by the node to be paired, the pairing request packet further comprises:

filling, by the node to be paired, an address 1 field in a null data frame with the MAC address of the parent node of the node to be paired, filling an address 2 field with the MAC address of the node to be paired, setting a first preset bit of an address 3 field to a first preset value to define the null data frame as a handshake frame, and setting a plurality of second preset bits of the address 3 field to a third preset value to define a type of the handshake frame as a pairing request, so as to generate and send the pairing request packet;

adding, by a relay node receiving the pairing request packet, the MAC address of the node to be paired to a refugee table stored by itself after determining that it can provide a relay service for the node to be paired, and returning a pairing approval packet to the node to be paired, wherein a receiving address of the pairing approval packet is the MAC address of the node to be paired;

wherein a sending address of the pairing approval packet is a MAC address of the relay node, and wherein the refugee table contains MAC addresses of all subordinate nodes that the relay node provides relay services for;

if the relay node receiving the pairing request packet is a non-root node, sending, by the relay node receiving the pairing request packet, a pairing notification packet whose receiving address is a MAC address of a parent node of the relay node and whose source address is the MAC address of the node to be paired, so that the parent node of the relay node receiving the pairing request packet adds the MAC address of the node to be paired to a refugee table stored by itself after receiving the pairing notification packet, and changes the receiving address of the pairing notification packet to a MAC address of its parent node, and then forwards the pairing notification packet uplink, until the pairing notification packet is forwarded to a root node; and adding, by the relay node receiving the pairing request packet, the MAC address of the node to be paired to a refugee table stored by itself if the relay node is the root node;

wherein a pairing is successful if the node to be paired receives the pairing approval packet.

12. The method for pairing nodes according to claim 11, further comprising:

returning, by the relay node receiving the pairing request packet, a pairing rejection packet to the node to be paired after determining that it cannot provide the relay service for the node to be paired, wherein a receiving address of the pairing rejection packet is the MAC address of the node to be paired, and a sending address of the pairing rejection packet is a MAC address of itself;

wherein the pairing fails if the node to be paired receives the pairing rejection packet.

\* \* \* \* \*